United States Patent
Bamji et al.

(10) Patent No.: US 6,515,740 B2
(45) Date of Patent: Feb. 4, 2003

(54) METHODS FOR CMOS-COMPATIBLE THREE-DIMENSIONAL IMAGE SENSING USING QUANTUM EFFICIENCY MODULATION

(75) Inventors: Cyrus Bamji, Fremont, CA (US); Edoardo Charbon, Berkeley, CA (US)

(73) Assignee: Canesta, Inc., San Jose, CA (US)

( * ) Notice: Subject to any disclaimer, the term of this patent is extended or adjusted under 35 U.S.C. 154(b) by 0 days.

(21) Appl. No.: 10/020,393

(22) Filed: Dec. 11, 2001

(65) Prior Publication Data

US 2002/0084430 A1 Jul. 4, 2002

Related U.S. Application Data

(60) Provisional application No. 60/254,873, filed on Dec. 11, 2000, and provisional application No. 60/247,158, filed on Nov. 9, 2000.

(51) Int. Cl.[7] .............................. G01C 3/08; G01C 1/00; G01B 11/26

(52) U.S. Cl. ...................... 356/141.1; 356/5.1; 356/4.01

(58) Field of Search ................ 356/141.1, 5.1, 356/4.01

(56) References Cited

U.S. PATENT DOCUMENTS

| | | | | | |
|---|---|---|---|---|---|
| 4,733,609 A | * | 3/1988 | Goodwin et al. | .......... | 244/3.16 |
| 5,710,621 A | * | 1/1998 | Tamura | ...................... | 356/5.15 |
| 6,115,114 A | * | 9/2000 | Berg et al. | ................. | 356/5.13 |

* cited by examiner

Primary Examiner—Stephen C. Buczinski
(74) Attorney, Agent, or Firm—Dorsey & Whitney LLP

(57) ABSTRACT

A preferably CMOS-implementable method measures distance and/or brightness by illuminating a target with emitted optical energy having a modulated periodic waveform whose high frequency component may be idealized as $S_1 = \cos(\omega \cdot t)$. A fraction of the emitted optical energy is reflected by a target and detected with at least one in a plurality of semiconductor photodetectors. Photodetector quantum efficiency is modulated to process detected signals to yield data proportional to the distance z separating the target and photodetector. Detection includes measuring phase change between the emitted optical energy and the reflected fraction thereof. Quantum efficiency can be modulated with fixed or variable phase methods and may be enhanced using enhanced photocharge collection, differential modulation, and spatial and temporal multiplexing. System power requirements may be reduced with inductors that resonate with photodetector capacitance at the operating frequency. The method can be implemented with on-chip photodetectors, associated electronics, and processing.

22 Claims, 16 Drawing Sheets

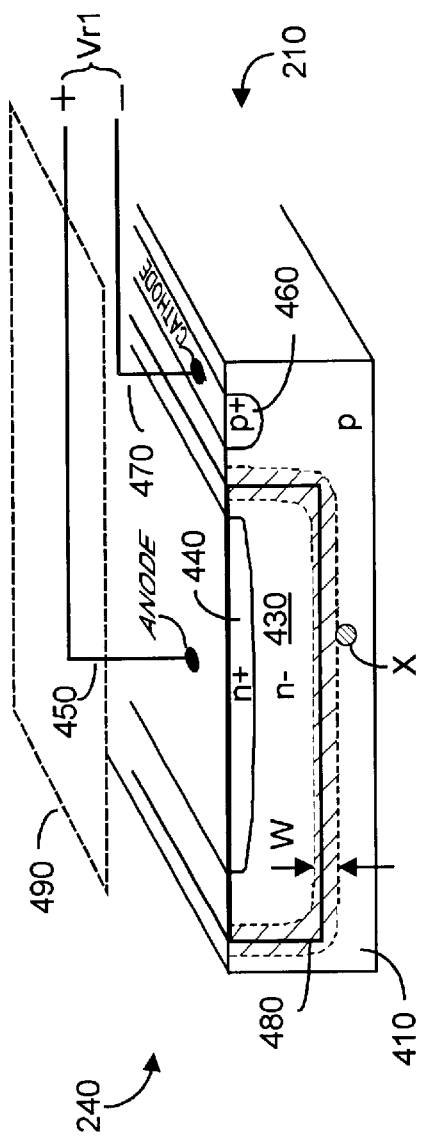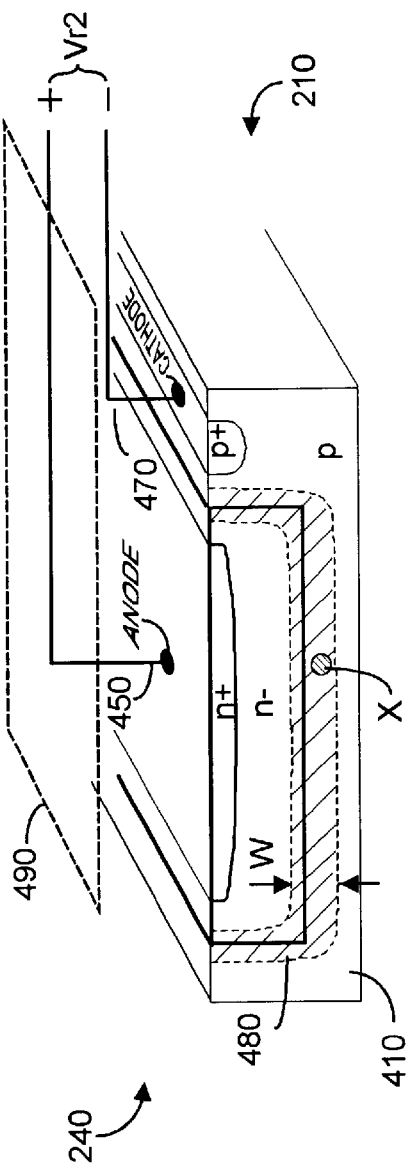
FIG. 5A
FIG. 5B

METHODS FOR CMOS-COMPATIBLE THREE-DIMENSIONAL IMAGE SENSING USING QUANTUM EFFICIENCY MODULATION

RELATION TO PREVIOUSLY FILED APPLICATIONS

Priority is claimed from applicants' co-pending U.S. provisional patent application serial No. 60/254,873 filed on Dec. 11, 2000 entitled "CMOS 3D Multi-Pixel Sensor Using Photodiode Quantum Efficiency Modulation" and 60/247,158, filed Nov. 9, 2000. Applicants incorporate said application herein by reference. Applicants also refer to and incorporates by reference herein co-pending U.S. utility application Ser. number 09/876,373 filed Jun. 6, 2001 entitled "CMOS-Compatible Three-Dimensional Image Sensing Using Reduced Peak Energy".

FIELD OF THE INVENTION

The invention relates generally to range finder type image sensors, especially range finder image sensors that are implementable on a single integrated circuit using CMOS fabrication, and more particularly to reducing power consumption of systems utilizing such sensors.

BACKGROUND OF THE INVENTION

Electronic circuits that provide a measure of distance from the circuit to an object are known in the art, and may be exemplified by system 10 FIG. 1. In the generalized system of FIG. 1, imaging circuitry within system 10 is used to approximate the distance (e.g., Z1, Z2, Z3) to an object 20, the top portion of which is shown more distant from system 10 than is the bottom portion. Typically system 10 will include a light source 30 whose light output is focused by a lens 40 and directed toward the object to be imaged, here object 20. Other prior art systems do not provide an active light source 30 and instead rely upon and indeed require ambient light reflected by the object of interest.

Various fractions of the light from source 30 may be reflected by surface portions of object 20, and is focused by a lens 50. This return light falls upon various detector devices 60, e.g., photodiodes or the like, in an array on an integrated circuit (IC) 70. Devices 60 produce a rendering of the luminosity of an object (e.g., 10) in the scene from which distance data is to be inferred. In some applications devices 60 might be charge coupled devices (CCDs) or even arrays of CMOS devices.

CCDs typically are configured in a so-called bucket-brigade whereby light-detected charge by a first CCD is serial-coupled to an adjacent CCD, whose output in turn is coupled to a third CCD, and so on. This bucket-brigade configuration generally precludes fabricating processing circuitry on the same IC containing the CCD array. Further, CCDs provide a serial readout as opposed to a random readout. For example, if a CCD range finder system were used in a digital zoom lens application, even though most of the relevant data would be provided by a few of the CCDs in the array, it would nonetheless be necessary to readout the entire array to gain access to the relevant data, a time consuming process. In still and some motion photography applications, CCD-based systems might still find utility.

As noted, the upper portion of object 20 is intentionally shown more distant that the lower portion, which is to say distance Z3>Z2>Z1. In a range finder autofocus camera environment, one might try to have devices 60 approximate average distance from the camera (e.g., from Z=0) to object 10 by examining relative luminosity data obtained from the object. In some applications, e.g., range finding binoculars, the field of view is sufficiently small such that all objects in focus will be at substantially the same distance. But in general, luminosity-based systems do not work well. For example, in FIG. 1, the upper portion of object 20 is shown darker than the lower portion, and presumably is more distant than the lower portion. But in the real world, the more distant portion of an object could instead be shinier or brighter (e.g., reflect more optical energy) than a closer but darker portion of an object. In a complicated scene, it can be very difficult to approximate the focal distance to an object or subject standing against a background using change in luminosity to distinguish the subject from the background. In such various applications, circuits 80, 90, 100 within system 10 in FIG. 1 would assist in this signal processing. As noted, if IC 70 includes CCDs 60, other processing circuitry such as 80, 90, 100 are formed off-chip.

Unfortunately, reflected luminosity data does not provide a truly accurate rendering of distance because the reflectivity of the object is unknown. Thus, a distant object surface with a shiny surface may reflect as much light (perhaps more) than a closer object surface with a dull finish.

Other focusing systems are known in the art. Infrared (IR) autofocus systems for use in cameras or binoculars produce a single distance value that is an average or a minimum distance to all targets within the field of view. Other camera autofocus systems often require mechanical focusing of the lens onto the subject to determine distance. At best these prior art focus systems can focus a lens onto a single object in a field of view, but cannot simultaneously measure distance for all objects in the field of view.

In general, a reproduction or approximation of original luminosity values in a scene permits the human visual system to understand what objects were present in the scene and to estimate their relative locations stereoscopically. For non-stereoscopic images such as those rendered on an ordinary television screen, the human brain assesses apparent size, distance and shape of objects using past experience. Specialized computer programs can approximate object distance under special conditions.

Stereoscopic images allow a human observer to more accurately judge the distance of an object. However it is challenging for a computer program to judge object distance from a stereoscopic image. Errors are often present, and the required signal processing requires specialized hardware and computation. Stereoscopic images are at best an indirect way to produce a three-dimensional image suitable for direct computer use.

Many applications require directly obtaining a three-dimensional rendering of a scene. But in practice it is difficult to accurately extract distance and velocity data along a viewing axis from luminosity measurements. Nonetheless many applications require accurate distance and velocity tracking, for example an assembly line welding robot that must determine the precise distance and speed of the object to be welded. The necessary distance measurements may be erroneous due to varying lighting conditions and other shortcomings noted above. Such applications would benefit from a system that could directly capture three-dimensional imagery.

Although specialized three dimensional imaging systems exist in the nuclear magnetic resonance and scanning laser tomography fields, such systems require substantial equipment expenditures. Further, these systems are obtrusive, and are dedicated to specific tasks, e.g., imaging internal body organs.

In other applications, scanning laser range finding systems raster scan an image by using mirrors to deflect a laser beam in the x-axis and perhaps the y-axis plane. The angle of defection of each mirror is used to determine the coordinate of an image pixel being sampled. Such systems require precision detection of the angle of each mirror to determine which pixel is currently being sampled. Understandably having to provide precision moving mechanical parts add bulk, complexity, and cost to such range finding system. Further, because these systems sample each pixel sequentially, the number of complete image frames that can be sampled per unit time is limited. It is understood that the term "pixel" can refer to an output result produced from one or more detectors in an array of detectors.

In summation, there is a need for a method and system that can produce direct three-dimensional imaging, preferably using circuitry that can be fabricated on a single IC using CMOS fabrication techniques, and requiring few discrete components and no moving components. Optionally, the system should be able to output data from the detectors in a non-sequential or random fashion. Very preferably, such system should require relatively low peak light emitting power such that inexpensive light emitters may be employed, yet the system should provide good sensitivity.

The present invention provides such a method.

SUMMARY OF THE PRESENT INVENTION

The present invention provides a system that measures distance and velocity data in real time using time-of-flight (TOF) data rather than relying upon luminosity data. The system is CMOS-compatible and provides such three-dimensional imaging without requiring moving parts. The system may be fabricated on a single IC containing both a two-dimensional array of CMOS-compatible pixel detectors that sense photon light energy, and associated processing circuitry.

In applicant's U.S. Pat. No. 6,323,942 B1 (2001) entitled "CMOS-Compatible Three-Dimensional Image Sensor IC", a microprocessor on a CMOS-compatible IC continuously triggered a preferably LED or laser light source whose light output pulses were at least partially reflected by points on the surface of the object to be imaged For good image resolution, e.g., a cm or so, a large but brief pulse of optical energy was required, for example, a peak pulse energy of perhaps 10 W, a pulse width of about 15 ns, and a repetition rate of about 3 KHZ. While average energy in applicant's earlier system was only about 1 mW, the desired 10 W peak power essentially dictated the use of relatively expensive laser diodes as a preferred energy light source. Each pixel detector in the detector array had associated electronics to measure time-of-flight from transmission of an optical energy pulse to detection of a return signal. In that invention, the transmission of high peak power narrow energy pulses required the use of high bandwidth pixel detector amplifiers.

Applicants' referenced co-pending parent application disclosed a system that transmitted high frequency component periodic signals having low average power and low peak power, e.g., tens of mW rather than watts. For ease of analysis, optical energy periodic signals such as an ideal sinusoid waveform, e.g., $\cos(\omega \cdot t)$, were assumed, and will be assumed herein. Emitting such low peak power high frequency component periodic signals permitted use of inexpensive light sources and simpler, narrower bandwidth pixel detectors. Bandwidths could be on the order of a few hundred KHz with an operating (emitted energy modulation) frequency of about 200 MHz. Good resolution accuracy was still obtainable using a low peak power optical emitter in that the effective duty cycle is greater than the output from a narrow-pulsed optical emitter of higher peak power.

In such system and in the present invention, assume that the energy emitted from the optical source is approximately $S_1 = K \cdot \cos(\omega \cdot t)$ where K is an amplitude coefficient, $\omega = 2\Pi f$, and frequency f is perhaps 200 MHz. Assume further that distance z separates the optical energy emitter from the target object. For ease of mathematical representation, K=1 will be assumed although coefficients less than or greater than one may be used. The term "approximately" is used in recognition that perfect sinusoid waveforms can be difficult to generate. Due to the time-of-flight required for the energy to traverse distance z, there will be a phase shift $\phi$ between the transmitted energy and the energy detected by a photo detector in the array, $S_2 = A \cdot \cos(\omega \cdot t + \phi)$. Coefficient A represents brightness of the detected reflected signal and may be measured separately using the same return signal that is received by the pixel detector.

The phase shift $\phi$ due to time-of-flight is:

$$\phi = 2 \cdot \omega \cdot z / C = 2 \cdot (2 \cdot \Pi \cdot f) \cdot z / C$$

where C is the speed of light 300,000 Km/sec. Thus, distance z from energy emitter (and from detector array) is given by:

$$z = \phi \cdot C / 2 \cdot \omega = \phi \cdot C / \{2 \cdot (2 \cdot \Pi \cdot f)\}$$

Distance z is known modulo $2\Pi C/(2 \cdot \omega) = C/(2 \cdot f)$. If desired, several different modulation frequencies of optically emitted energy may be used, e.g., $f_1$, $f_2$, $f_3$ . . . , to determine z modulo $C/(2 \cdot f_1)$, $C/(2 \cdot f_2)$, $C/(2 \cdot f_3)$. The use of multiple different modulation frequencies advantageously can reduce aliasing. If $f_1$, $f_2$, $f_3$ are integers, aliasing is reduced to the least common multiplier of $f_1$, $f_2$, $f_3$, denoted LCM($f_1$, $f_2$, $f_3$). If $f_1$, $f_2$, $f_3$ are not integers, they preferably are modeled as fractions expressible as $a_1/D$, $a_2/D$, and $a_3/D$, where i in $a_i$ is an integer, and D=(GCD) represents the greatest common divisor of $a_1$, $a_2$, $a_3$. From the above, distance z may be determined modulo LCM($a_1$, $a_2$, $a_3$)/D. This same analytical approach is also practiced with the various embodiments of the present invention, described later herein.

Phase $\phi$ and distance z were determined by mixing (or homodyning) the signal detected by each pixel detector $S_2 = A \cdot \cos(\omega \cdot t + \phi)$ with the signal driving the optical energy emitter $S_1 = \cos(\omega \cdot t)$. The mixing product $S_1 \cdot S_2$ is $0.5 \cdot A \cdot \{\cos(2 \cdot \omega \cdot t + \phi) + \cos(\phi)\}$ and will have a time average value of $0.5 \cdot A \cdot \cos(\phi)$. If desired, the amplitude or brightness A of the detected return signal may be measured separately from each pixel detector output.

To implement homodyne determination of phase $\phi$ and distance z, each pixel detector in the detector array had its own dedicated electronics that included a low noise amplifier to amplify the signal detected by the associated pixel detector, a variable phase delay unit, a mixer, a lowpass filter, and an integrator. The mixer mixed the output of low noise amplifier with a variable phase delay version of the transmitted sinusoidal signal. The mixer output was lowpass filtered, integrated and fedback to control phase shift of the variable phase delay unit. In the equilibrium state, the output of each integrator will be the phase $\psi$(where $\psi = \phi \pm \Pi/2$) associated with the TOF or distance z between the associated pixel detector and a point a distance z away on the target object. The analog phase information is readily digitized, and an on-chip microprocessor can then calculate z-values from each pixel detector to an associated point on the target object. The microprocessor further can calculate dz/dt (and/or dx/dt, dy/dt) and other information if desired.

However applicants' referenced parent co-pending provisional application substantially enhances detection sensitivity for such systems in which low peak power high frequency component periodic signals were used, and in which phase delay is used to determine TOF, dz/dt (and/or dx/dt, dy/dt, and other information. More specifically, an improved mixer is described, in which mixing results from modulating quantum efficiency (QE) of the photodiodes in the detector array, for example through use of a MOS transistor gate or altering reverse bias of the photodiodes. Such mixing offers many advantages including improved high frequency sensitivity, improved detection signal/noise, smaller form factor, lower power consumption, and less cost to fabricate.

Several embodiments of QE modulation are described in the present invention. Conceptually the embodiments may be grouped into two general categories. One category involves variable phase delay approaches (not unlike those described in applicants' co-pending application Ser. No. 09/876,373) but in which dedicated electronic mixers (e.g., Gilbert cells) are replaced by QE modulation. A second category involves mixing with fixed phase delays using QE modulation, and implements a variety of spatial and temporal multiplexing approaches. Advantageously, both methods can modulate QE of MOS-implemented photodiodes by changing photodiode reverse bias, or by providing MOS-implemented photodiodes with a photogate, and then changing the gate voltage. Single-ended or double-ended differential signal processing may be employed with both methods. Differential QE modulation advantageously allows faster QE modulation, and provides a differential output that substantially removes common mode effects due to ambient light and photodiode dark current. In general, both categories of methods advantageously accumulate photodetector signal charge on a photodiode capacitor. If desired, accumulated charge may be examined periodically when QE modulation is stopped. Such signal accumulation approaches are preferred over methods that seek to directly measure a high frequency small magnitude photocurrent.

Using variable phase delay (category one), photocurrent from each QE-modulated pixel photodiode (or photogate photodiode) is coupled as input to an associated relatively high input impedance amplifier that need not exhibit high bandwidth, high frequency response, or high closed-loop gain. The amplifier output feeds directly to a low pass filter (LPF) whose output drives an integrator. The integrator output is coupled as to control phase of the variable phase delay (VPD) that controls QE modulation signals that drive the photodetector diodes. The VPD is also driven by a signal from the periodic signal generator that controls the optical energy emitter. There may or may not be a DC offset associated with the output signal from the pixel photodiode detectors and with the homodyne drive signal. Assuming no offsets, at steady-state the LPF output will be zero. Assuming appropriate DC offsets, at steady-state the LPF output will be a minima or a maxima. This method may be implemented single-ended, or preferably double-ended using a complementary approach in which positive and negative signals are derived from photodiodes that are QE modulated out of phase.

Using fixed phase delay (category two) fixed homodyne signals are used to QE modulate each photodetector. In category two, different groups or banks of photodiode detectors may be defined in a non-localized manner within the array. For example, a first bank of photodiode detectors may be QE modulated with fixed 0° phase shift, a second bank may be QE modulated with fixed 90° phase, shift, a third bank with fixed 180° phase shift, and a fourth bank with fixed 270° phase shift. Within each pixel, there may be photodiode detectors that correspond to every one of the four banks. Phase information and target object brightness information can be determined by examining output values for each bank within a pixel. This fixed delay approach simplifies the electronic circuitry associated with each pixel, reduces power consumption, can reduce IC chip area requirement, and enables a range of techniques for temporal and spatial multiplexing.

In the various embodiments of the present invention, on-chip measurement information may be output in random rather than sequential order, and on-chip signal processing for object tracking and other information requiring a three-dimensional image can be readily accomplished. The overall system is small, robust, requires relatively few off-chip discrete components, and exhibits improved detection signal characteristics. On-chip circuitry can use such TOF data to readily simultaneously measure distance and velocity of all points on an object or all objects in a scene.

Other features and advantages of the invention will appear from the following description in which the preferred embodiments have been set forth in detail, in conjunction with their accompanying drawings.

BRIEF DESCRIPTION OF THE DRAWINGS

FIGS. 5A and 5B are cross-sectioned perspective views of a photodetector diode, showing reverse bias voltage modulation of depletion layer width to implement QE modulation, according to the present invention;

DETAILED DESCRIPTION OF THE PREFERRED EMBODIMENTS

The present invention advantageously transmits and detects optical energy that is periodic with a high frequency component, and relies upon phase shift between transmitted and detected waveforms to discern time-of-flight and thus z-distance data. Although pulsed-type periodic waveforms may be used, the present invention will be described with respect to the emission and detection of sinusoidal waveforms, as such waveforms are rather easily analyzed mathematically. However it is to be understood that periodic pulsed waveforms with a high frequency component including imperfect sinusoidal waveforms are representable mathematically as groupings of perfect sinusoidal waveforms of varying coefficients and frequency multiples. The transmission and detection of such waveforms can advantageously permit use of relatively inexpensive low peak-power optical emitters, and the use of relatively lower bandwidth amplifiers. This is in contrast to applicant's referenced U.S. Pat. No. 6,323,942 B1 (2001) in which a low duty cycle pulse train of narrow pulse widths was emitted by a very high peak power optical emitter.

Figure 1:
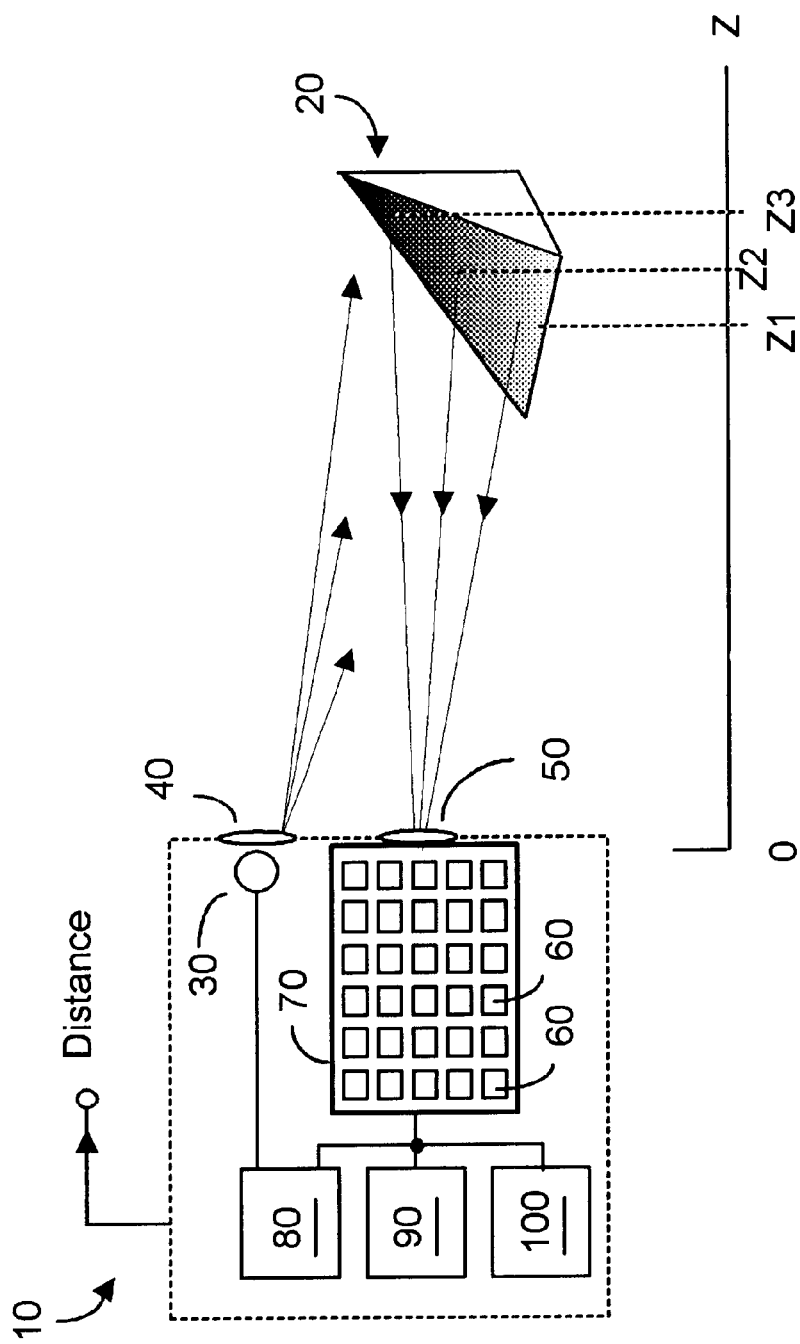
FIG. 1 is a diagram showing a generic luminosity-based range finding system, according to the prior art.
Figure 2A:
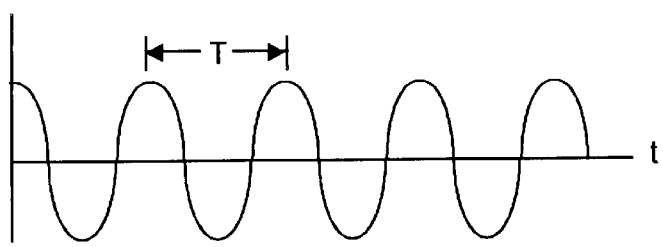
FIG. 2A depicts a transmitted periodic signal with high frequency components transmitted by the present invention, here an ideal cosine waveform.

FIG. 2A depicts the high frequency component of an exemplary idealized periodic optical energy signal as emitted by the present invention, here a signal represented as $\cos(\omega t)$. The period T of the waveform shown is $T=2\cdot\Pi/\omega$. The signal is depicted as though it were AC-coupled in that any magnitude offset is not present. As described below, the operative frequency of the transmitted signal preferably is in the few hundred MHz range, and the average and the peak transmitted power may be relatively modest, e.g., less than about 50 mW or so.

Figure 2B:
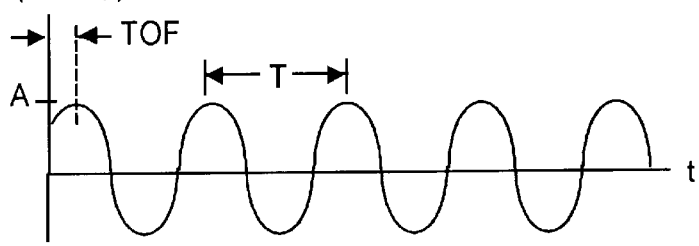
FIG. 2B depicts the return waveform with phase-delay for the transmitted signal of FIG. 2A, as used by the present invention.

A portion of the transmitted energy reaches a target object and is at least partially reflected back toward the present invention, to be detected. FIG. 2B depicts the returned version of the transmitted waveform, denoted $A\cdot\cos(\omega t+\phi)$, where A is an attenuation coefficient, and $\phi$ is a phase shift resulting from the time-of-flight (TOF) of the energy in traversing the distance from the present invention to the target object. Knowledge of TOF is tantamount to knowledge of distance z from a point on the object target, e.g., target 20, to the recipient pixel detector in the array of detectors within a system according to the present invention.

Figure 2C:
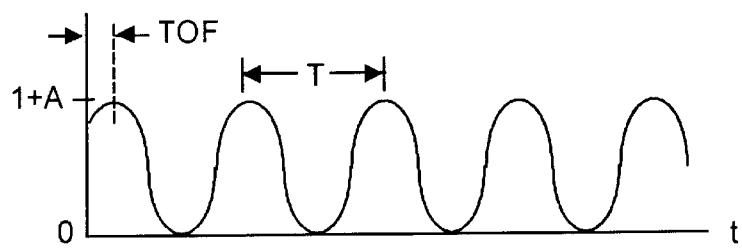
FIG. 2C depicts a return waveform similar to that shown in FIG. 2B, but with a DC-offset level, as used by the present invention.

FIG. 2C is similar to what is shown in FIG. 2B except that in the present invention, a DC-offset is present. The waveform shown in FIG. 2B may be described as $1+A\cdot\cos(\omega t+\phi)$. As described later herein, a DC-offset is desirable in some embodiments for biasing the photodiodes, but does not really affect the underlying mathematics. Again it is understood that the period T of the waveform in FIG. 2C, as in FIGS. 2A and 2B is $T=2\cdot\Pi/\omega$.

Figure 2D:
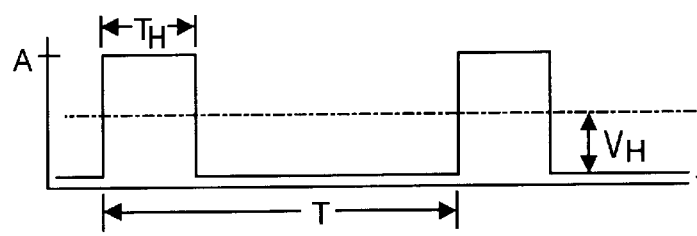
FIG. 2D depicts a pulse-type periodic waveform of emitted optical energy, such as might be emitted by a system according to applicants' earlier invention, now U.S. Pat. No. 6,323,942 B1.
Figure 2E:
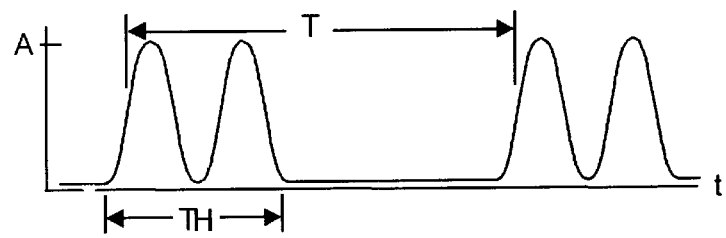
FIG. 2E depicts a non-pulse periodic waveform of emitted optical energy, according to the present invention.

FIGS. 2D and 2E are useful in understanding the notion of duty cycle, as used herein. In a pulse-type periodic signal such as shown in FIG. 2D, duty cycle d may be defined as the ratio of time $T_H/T$, where $T_H$ is the time the signal is higher than a given threshold $V_H$, and T is the signal period. Threshold level $V_H$ is usually the average of the maximum and the minimum signal levels. Within the context of the present invention, the above definition is analogous, except that $T_H$ will represent the time during which a photodiode detector 240-x is modulated, where T is the repetition period associated with turning modulation on and off for emitter 220, as shown in FIG. 2E. Within the context of the present invention, the ratio $T_H/T$ can be decreased, provided that the peak power emission of optical energy emitter 220 is adjusted appropriately, so as to keep the average power constant. As noted, while the optical energy emitted by emitter 220 will be periodic, it need not be a square-wave or square-wave like. A waveform such as shown in FIG. 2E could be emitted and detected. However it is understood that the above definitions of duty cycle are also applicable to waveforms such as shown in FIG. 2E.

Specifying a repetition rate of the transmitted periodic optical energy signal involves tradeoffs that include considerations of the transmitted waveshape and duty cycle, the desired granularity in resolving z-distance, and peak power requirements for the optical energy emitter. For example, a transmitted periodic signal whose high frequency component is a few hundred MHz, e.g., 200 MHz, is consistent with z-distance resolution on the order of a cm or so, assuming eight-bit analog-to-digital conversion of the detected phase shift information. In practice, assuming a continuous sinusoidal-type waveform, the peak power required from the optical energy emitter will be about 10 mW. Of course if the transmitted waveform duty cycle were decreased to say 1%, the optical energy emitter peak power would have to be increased to about 500 mW, and so on. It will be appreciated that the ability to use a low peak power optical emitter is one of the distinguishing factors between the present invention and applicant's above-referenced U.S. Pat. No. 6,323,942 B1 (2001).

Figure 3:
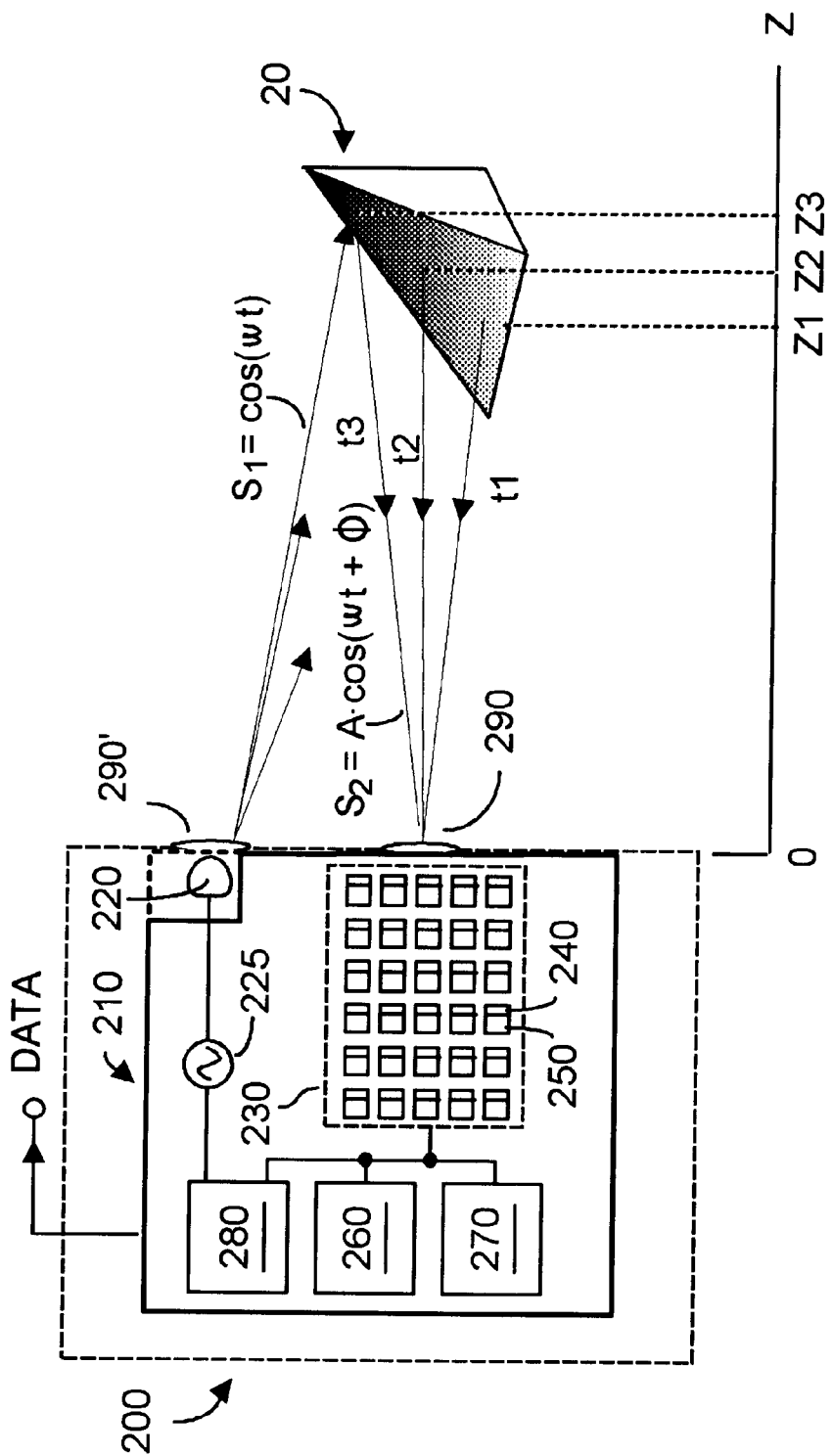
FIG. 3 is a block diagram of a preferred implementation of the present invention.

The processing and use of phase shift information in the present invention will now be described with reference to FIG. 3, a block diagram depicting the present invention 200, a three-dimensional imaging system that preferably is fabricated on a single IC 210. System 200 requires no moving parts and relatively few off-chip components. Although FIG. 3 is taken from applicants' referenced co-pending utility patent application, it can be used to describe the present invention, although circuit details of various elements in FIG. 3 will be different. In overview, in the various embodiments of the present invention, preferably each photodetector 240-x within array 230 has associated electronics 250-x that implements QE modulation in the photodetectors. Whether using variable phase delay or fixed phase delay techniques, the present invention determines distance z according to $z=\phi \cdot C/2 \cdot \omega = \phi \cdot C/\{2 \cdot (2 \cdot \Pi \cdot f)\}$.

System 200 includes an optical emitter, for example a low peak power laser diode, or low peak power LED, that can output a periodic signal with 50 mW or so peak power when driven with a repetition rate of a few hundred MHz and, in the preferred embodiment, a duty cycle close to 100%, as duty cycle is defined herein. At present, useful optical emitters are made from materials such as AlGaAs, whose bandgap energies are quite different than that of silicon, from which CMOS IC 210 is preferably fabricated. Thus, while FIG. 3 depicts optical emitter 220 as being off-chip 210, the phantom lines surrounding emitter 220 denote that an optical emitter 220 made of CMOS-compatible materials may instead be fabricated on IC 210.

Light source 220 is preferably a low peak power LED or a laser that emits energy with a wavelength of perhaps 800 nm, although other wavelengths could instead be used. Below 800 nm wavelength, emitted light starts to become visible and laser fabrication becomes more difficult. Above 900 nm CMOS/silicon photodiode efficiency drops off rapidly, and in any event, 1100 nm is the upper wavelength for a device fabricated on a silicon substrate, such as IC 210. By using emitted light having a specific wavelength, and by filtering out incoming light of different wavelength, system 200 can operate with or without ambient light. The ability of system 200 to function in the dark can be advantageous in certain security and military type imaging applications. Off-chip mounted lens 290 preferably focuses filtered incoming light energy onto sensor array 230 such that each pixel detector 240x receives light from only one particular point (e.g., an object surface point) in the field of view. The properties of light wave propagation allow an ordinary lens 290 to be used to focus the light onto the sensor array. If a lens (290') is required to focus the optical light energy transmitted from emitter 220, a single lens could be used for 290, 290' if a mirror-type arrangement were used. Typical LED or laser diode emitters 220 have a shunt capacitance of perhaps 100 pF. Thus in driving emitter 220, it would be advantageous to place a small inductance (perhaps a few nH) in parallel with this capacitance, where the combined inductance-capacitance resonate at the periodic frequency of the emitter, typically a few hundred MHz. Alternatively, inductance (again a few nH) can be series-coupled to the emitter and its parasitic capacitance. If desired, such inductance can be derived using a bonding wire to the emitter.

CMOS-compatible IC 210 will preferably have fabricated thereon oscillator 225 driver, array 230 (comprising perhaps 100×100 (or more) pixel detectors 240 and 100×100 (or more) associated electronic processing circuits 250), microprocessor or microcontroller unit 260, memory 270 (which preferably includes random access memory or RAM and read-only memory or ROM), and various computing and input/output (I/O) circuitry 280, including, for example an analog/digital (A/D) conversion unit providing perhaps 8-bit A/D conversions of phase information φ detected by the various pixel detectors in array 230. Depending upon implementation, a single on-chip A/D converter function could be provided, or a dedicated A/D converter could be provided as part of each electronic processing circuit 250. I/O circuit 280 preferably can also provide a signal to control frequency of the oscillator 225 that drives the energy emitter 220.

The DATA output line shown in FIG. 3 represents any or all information that is calculated by the present invention using phase-shift information from the various pixel detectors 240 in array 230. Preferably microprocessor 260 can examine consecutive frames stored in RAM 270 to identify objects in the field of view scene. Microprocessor 260 can then compute z-distance and can compute object velocity dz/dt, dx/dt, dy/dt. Further, microprocessor 260 and associated on-chip circuitry can be programmed to recognize desired image shapes, for example a user's fingers if an application using system 200 to detect user interface with a virtual input device. The data provided by microprocessor 260 could be reduced to keystroke information in such an application. Any or all of this data (denoted DATA in FIG. 3) can be exported from the IC to an external computer for further processing, for example via a universal serial bus. If microprocessor 260 has sufficient computational power, additional on-chip processing may occur as well. Note too that output from the array of CMOS-compatible detectors 240 may be accessed in a random manner if desired, which permits outputting TOF DATA in any order.

Among its other functions, microprocessor 260 acting through interface circuit 280 causes driver 225 to oscillate periodically with a desired duty cycle at a desired frequency, for example $f_1=200$ MHz. In response to signals from oscillator driver 225, laser diode or LED 220 emits optical energy at the desired frequency, e.g., $f_1=200$ MHz and duty cycle. Again, while a sinusoid or cosine waveform is assumed for ease of mathematical representation, a periodic waveform with similar duty cycle, repetition rate and peak power may be used, e.g., perhaps squarewaves. As noted, average and peak power is advantageously quite modest in the present invention, for example 10 mW. As a result, the cost of an LED optical emitter 220 is perhaps 30¢ compared to a cost of many dollars for a high peak power laser diode in applicant's earlier invention, described in U.S. Pat. No. 6,323,942 B1 (2001).

The optical energy whose periodic high frequency component is ideally represented as $S_1=\cos(\omega t)$ is focused by optional lens 290' upon target object 20, some distance z away. At least some of the optical energy falling upon target 20 will be reflected back towards system 200 and will be detected by one or more pixel detectors 240 in array 230. Due to the distance z separating system 200, more particularly a given pixel detector 240 in array 230, and the target point on object 20, the detected optical energy will be delayed in phase by some amount φ that is proportional to time-of-flight, or to the separation distance z. The incoming optical energy detected by different pixel detectors 240 can have different phase φ since different times-of-flight or distances z are involved. In various figures including FIG. 3, the incoming optical energy is denoted as $S_2 = A \cdot \cos(\omega t + \phi)$, e.g., the AC component of a return signal that will in fact include a DC component. However the DC component is relatively unimportant and is not depicted in the figures.

As will be described, it is the function of electronics 250 associated with each pixel detector 240 in array 230 to examine and determine the relative phase delay, in cooperation with microprocessor 260 and software stored in memory 270 executed by the microprocessor. In an application where system 200 images a data input mechanism, perhaps a virtual keyboard, microprocessor 260 may process detection data sufficient to identify which of several virtual keys or regions on a virtual device, e.g., a virtual keyboard, have been touched by a user's finger or stylus. Thus, the DATA output from system 200 can include a variety of information, including without limitation distance z, velocity dz/dt (and/or dx/dt, dy/dt) of object 20, and object identification, e.g., identification of a virtual key contacted by a user's hand or stylus.

Preferably IC 210 also includes a microprocessor or microcontroller unit 260, memory 270 (which preferably includes random access memory or RAM and read-only memory or ROM), and various computing and input/output (I/O) circuitry 280. For example, an output from I/O circuit 280 can control frequency of the oscillator 225 that drives the energy emitter 220. Among other functions, controller unit 260 may perform z distance to object and object velocity (dz/dt, dy/dt, dx/dt) calculations. The DATA output line shown in FIG. 3 represents any or all such information that is calculated by the present invention using phase-shift information from the various pixel detectors 240. The two-dimensional array 230 of pixel sensing detectors preferably is fabricated using standard commercial silicon technology. This advantageously permits fabricating a single IC 210 that includes the various pixel detectors 240 and their associated circuits 250, as well as circuits 225, 260, 270, 280, and preferably the energy emitter 220 as well. Understandably, the ability to fabricate such circuits and components on the same IC with the array of pixel detectors can shorten processing and delay times, due to shorter signal paths. In FIG. 3, while system 200 may include focusing lens 290 and/or 290', it is understood that these lenses will be fabricated off IC chip 210.

Each pixel detector 240 is equivalent to a parallel combination of a current source, an ideal diode, shunt impedance, and noise current source, and will output a current proportional to the amount of incoming photon light energy falling upon it. Preferably CMOS fabrication is used to implement the array of CMOS pixel diodes or photogate detector devices. Exemplary photodiode fabrication techniques include diffusion-to-well, diffusion-to-substrate, a well-to-substrate junction, and photogate structures. Well-to-substrate photodiodes are more sensitive to infrared (IR) light, exhibit less capacitance, and are thus preferred over diffusion-to-substrate photodiodes.

Figure 4:
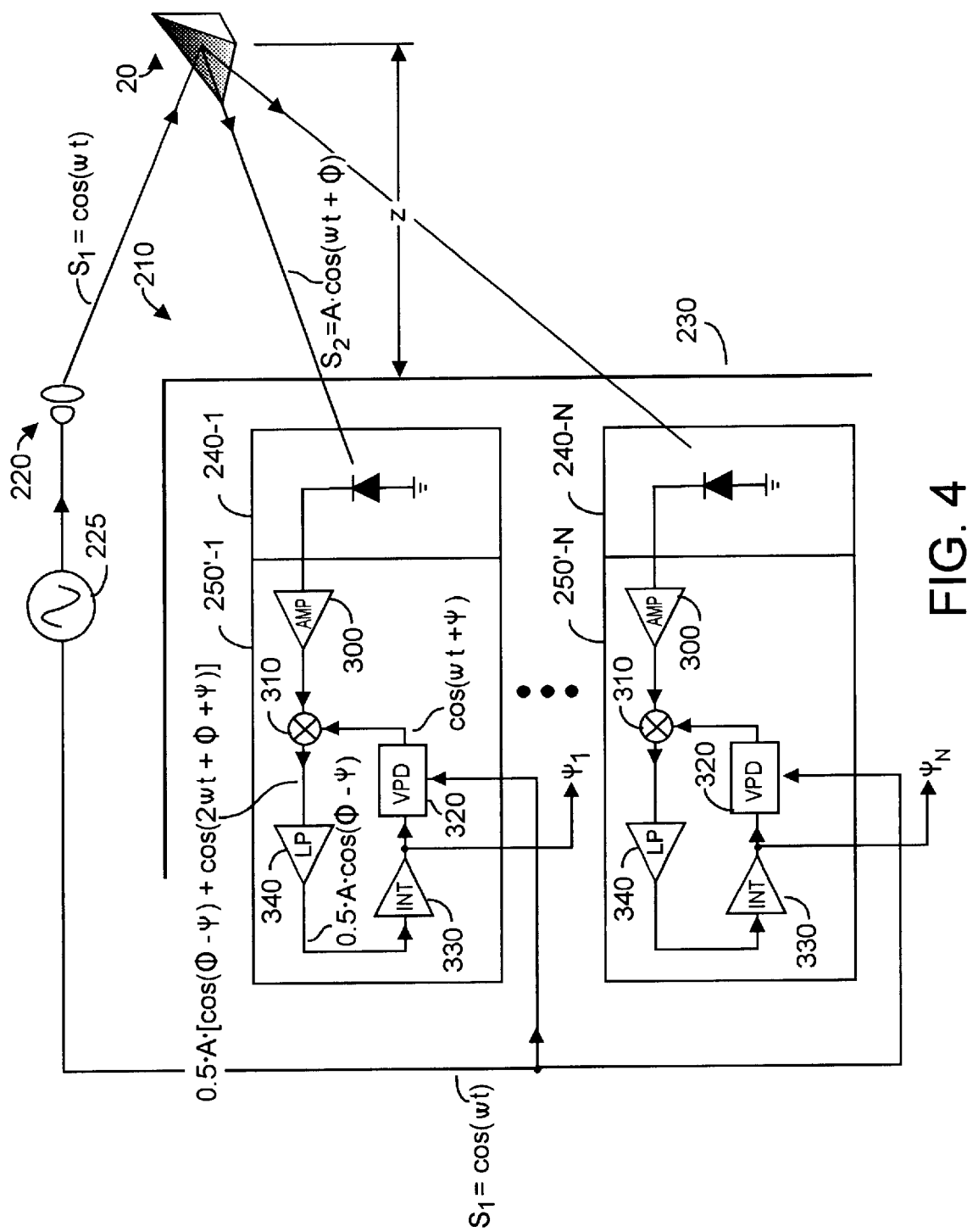
FIG. 4 is a block diagram showing two pixel detectors with their associated electronics, according to applicants' parent utility application.
Figure 9A:
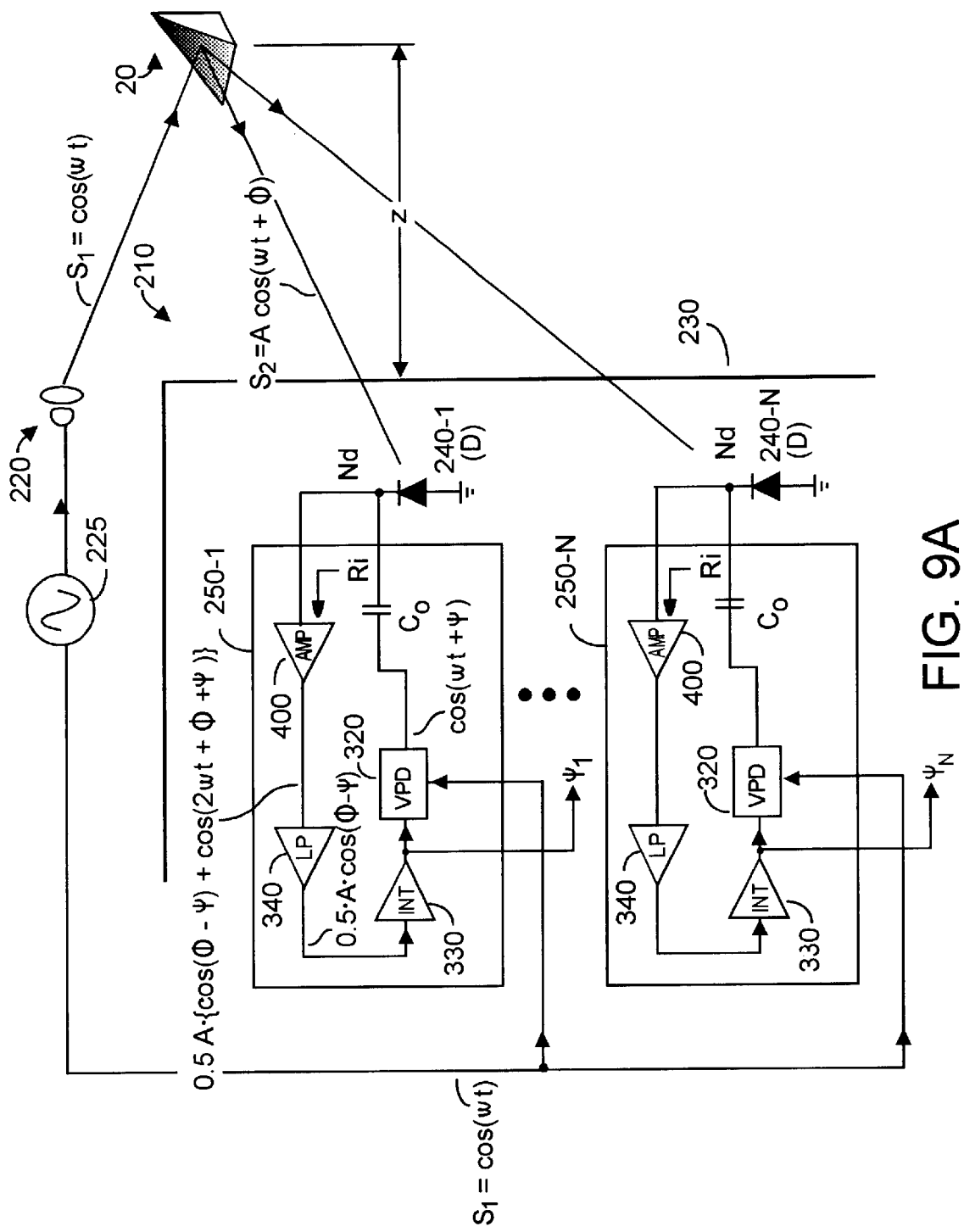
FIG. 9A is a block diagram showing two photodetectors and their associated electronics in a single-ended variable phase delay (VPD) QE modulated embodiment of the present invention.
Figure 9B:
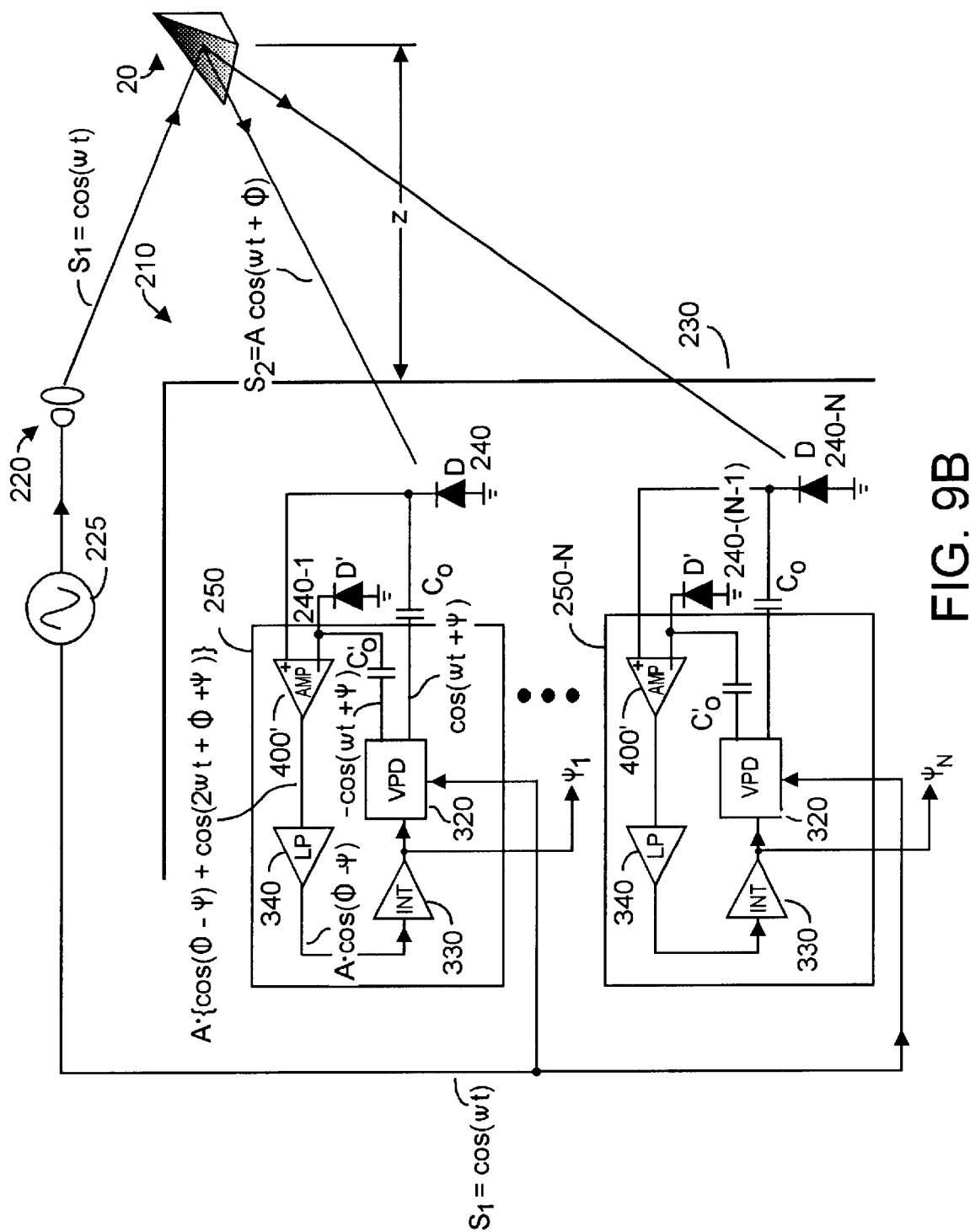
FIG. 9B is a block diagram of a VPD embodiment showing two pixels comprising four photodetectors with their associated electronics in which photodiodes are QE differentially modulated, according to the present invention.
Figure 9C:
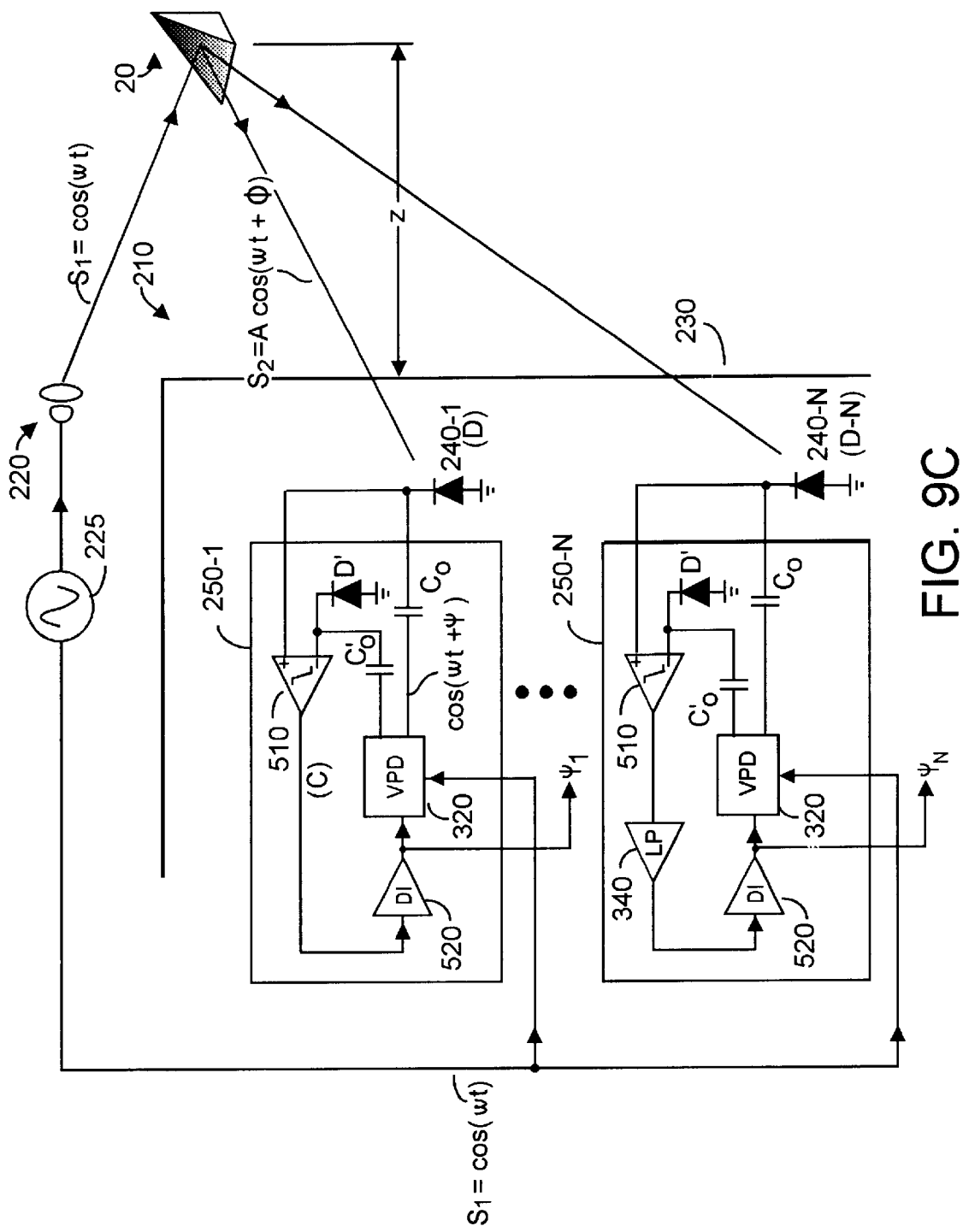
FIG. 9C is a block diagram of a VPD embodiment showing two pixels comprising four photodetectors with their associated simplified electronics including digital integrators, in which photodiodes are QE differentially modulated, according to the present invention.

As noted FIG. 4 represents an embodiment described in applicants' co-pending utility patent application. FIG. 4 represents a portion of IC 210 and of array 230, and depicts pixel detectors 240-1 through 240-x, and each diode's associated exemplary electronics 250'-1 through 250'-x. For ease of illustration in various figures including FIG. 4, lens 290 is not depicted. FIG. 4 does not relate directly to the present invention, but is included to provide a better understanding and appreciation for the benefits provided by the present invention. In the description that follows, FIGS. 9A-9C are directed to category one VPD QE modulation techniques and FIGS. 10A-10C are directed to category two fixed phase modulation techniques, with the remaining figures illustrating aspects of these various techniques.

In FIG. 4, only two pixel diodes 240 and two associated electronic circuits 250' are depicted, for ease of illustration however an actual array will include hundreds or thousands or more of such pixel detectors and associated electronic circuits. As noted, if desired a dedicated A/D converter could be provided as part of each electronics circuit 250'-1 through 250'-x, as opposed to implementing an omnibus A/D function on IC chip 210.

Consider now detection of incoming optical energy by pixel detector 240-1. Assuming that a low power LED or laser diode or the like 220 emits optical radiation having idealized high frequency component $S_1 = \cos(\omega \cdot t)$, a fraction of such radiation reflected from a point on the surface of target 20 (distance z away) is given by $S_2 = A \cdot \cos(\omega \cdot t + \phi)$. Upon receiving this incoming radiation, pixel detector 240-1 outputs a signal that is amplified by low noise amplifier 300. An exemplary amplifier 300 might have a closed-loop gain of perhaps 12 dB.

As noted, periodic emissions from optical source 220 preferably are sinusoidal or sinusoidal-like with a high frequency component of a few hundred MHz. Despite this high optical modulation frequency, it suffices for amplifier 300 to have a bandwidth of perhaps 100 KHz or so, perhaps as low as tens of KHz because all frequencies of interest are close to this modulation frequency. It will be appreciated that providing hundreds or thousands of low noise, relatively low bandwidth amplifiers 300 on IC 210 is an easier and more economical undertaking than providing high bandwidth amplifiers able to pass narrow pulses, as in applicant's parent invention. Thus, in FIG. 4, array 230 can function with relatively small bandwidth amplifiers 300, where each amplifier output is coupled directly to a first input of an associated mixer 310, whose second input is a signal of like frequency as that present at the first input. If each amplifier 300 and its associated mixer 310 were implemented as a single unit, it could suffice for the overall unit to have a bandwidth on the order of tens of KHz, and a high frequency response also on the order of tens of KHz.

As shown in FIG. 4, when comparing the detected signal to the transmitted signal, there will be a phase shift φ that is related to TOF and to distance z. Each circuit 250'-x couples the output of the associated low noise amplifier 300 to the first input of a mixer 310. In applicants' earlier invention for which FIG. 4 is descriptive, mixer 310 could be implemented as Gilbert cells, multipliers, etc.

In essence, each mixer 310 will homodyne the amplified detected output signal $S_2$ from an associated pixel detector 240 with a generator 225 signal $S_1$. Assuming that the optical energy emitted has an idealized high frequency component represented as a sine wave or cosine wave, the mixer output product $S_1 \cdot S_2$ will be $0.5 \cdot A \cdot \{\cos(2 \cdot \omega \cdot t + \phi) + \cos(\phi)\}$ and will have an average value of $0.5 \cdot A \cdot \cos(\phi)$. If desired, the amplitude or brightness A of the detected return signal may be measured separately from each pixel detector output. In practice, an eight-bit analog-to-digital resolution of $A \cdot \cos(\phi)$ will result in about 1 cm resolution for z-measurements.

Each mixer 310 will have a second input coupled to the output of a variable phase delay (VPD) unit 320. VPD units 320 may be implemented in many ways, for example using a series-coupled string of inverters whose operating power supply voltage is varied to speed-up or slow-down the ability of each inverter to pass a signal. A first input to each VPD unit 320 will be derived from signal generator 225, and will be $S_1 = \cos(\omega t)$, give or take a signal coefficient. Assume that VPD 320 adds a variable time delay $\psi$ to the $\cos(\omega t)$ signal derived from generator 225. Mixer 310 then mixes the amplified $\cos(\omega \cdot t + \phi)$ signal output by amplifier 300 with the $\cos(\omega \cdot t + \psi)$ signal output by VPD 320. Mixer 310 now outputs signals including $0.5 \cdot A \cdot \{\cos(\phi - \psi) + \cos(2 \cdot \omega \cdot t + \phi + \psi)\}$. The output of mixer 310 is coupled to the input of a low pass filter 340 that preferably has a bandwidth of a 100 Hz or so to a few KHz or so, such that the output from filter 340 will be a low frequency signal proportional to $0.5 \cdot A \cdot \cos(\phi - \psi)$. This low frequency signal is now input to an integrator 330 whose output will be $\phi_x$ for pixel detector 240-x.

VPD 320 is driven by two signals that each have the same modulation frequency as that emitted by optical emitter 220, albeit with a phase difference ($\phi - \psi$). Note that if phase shift $\psi = \phi \pm 90°$, the polarity of integrator 330 output will change. In the configuration shown in FIG. 4, phase shift $\psi_x = \phi_x \pm 90°$ associated with the return signal detected by each pixel detector 240-x is available from that pixel detector's integrator 330-x.

The phase shift $\phi$ due to time-of-flight may be given by:

$$\phi = 2 \cdot \omega \cdot z / C = 2 \cdot (2 \cdot \Pi \cdot f) \cdot z / C$$

where C is speed of light 300,000 Km/sec. Thus, distance z from energy emitter 220 to a pixel detector 240-x in array 230 is given by:

$$z = \phi \cdot C / 2 \cdot \omega = \phi \cdot C / \{2 \cdot (2 \cdot \Pi \cdot f)\}$$

Distance z is known modulo $2\Pi C/(2 \cdot \omega) = C/(2 \cdot f)$. Using several different modulation frequencies such as $f_1$, $f_2$, $f_3$ . . . , permits determining distance z modulo $C/(2 \cdot f_1)$, $C/(2 \cdot f_2)$, $C/(2 \cdot f_3)$, etc., and further avoids, or at least reduces, aliasing. For example, microprocessor 260 can command generator 225 to output sinusoidal drive signals of chosen frequencies, e.g., $f_1$, $f_2$, $f_3$, etc. If $f_1$, $f_2$, $f_3$ are integers, e.g., i=integer, aliasing is reduced to the least common multiplier of $f_1$, $f_2$, $f_3$, denoted LCM($f_1$, $f_2$, $f_3$). If $f_1$, $f_2$, $f_3$ are not integers, they preferably are modeled as fractions expressible as $a_1/D$, $a_2/D$, $a_3/D$, where $a_i$ denotes integer i, and D=GCD($a_1$, $a_2$, $a_3$), where GCD denotes greatest common divisor. Distance z can then be determined modulo LCM($a_1$, $a_2$, $a_3$)/D.

The closed-loop feedback circuit configuration of FIG. 4 reaches a stable point when the two input signals to each mixer 310 are 90° out of phase with respect to each other, e.g., at a chosen one of $\psi_x = \phi_x + 90°$ or $\psi_x = \phi_x - 90°$, depending upon circuit implementation. At the proper 90° out-of-phase steady-state, the output signal from each lowpass filter 340 will be, ideally, null. For example, should the output signal from a lowpass filter 340 signal go positive, then the output signal from the associated integrator 330 will add more phase shift to drive the lowpass filter output back towards a null state.

When the feedback system is at a stable state, the pixel detector electronics 250'-x in array 230 provide various phase angles $\psi_1$, $\psi_2$, $\psi_3$, . . . $\psi_N$, where $\psi_x = \phi_x \pm 90°$. The phase angles are preferably converted from analog format to digital format, for example using an analog/digital converter function associated with electronics 280. If desired, electronics 250'-x could mix signals having a constant phase value for all pixels. Advantageously microprocessor 260 can then execute software, e.g., stored or storable in memory 270 to calculate z-distances (and/or other information) using the above mathematical relationships. If desired, microprocessor 260 can also command generator 225 to output discrete frequencies e.g., $f_1$, $f_2$, $f_3$. . . to improve system performance by reducing or even eliminating aliasing errors.

Referring still to FIG. 4, various implementations may be used to generate phase angle $\psi = \phi \pm 90°$. Assume that a given application requires acquisition of an image at a frame rate of 30 frames/second. In such application, it suffices to sample phase angle $\psi$ during A/D conversion with a sample rate of about 30 ms. This sample rate is commensurate with the relatively low bandwidth otherwise present within electronics 250'-x, as shown in FIG. 4. In practice, system 200 can provide z-distance resolution of about 1 cm and in practical applications, z-range will be within perhaps 100 m or less.

Although z-distance is determined from TOF information acquired from phase delay $\psi$, it is noted that the relative brightness of the signals returned from target object 20 can also provide useful information. The amplitude coefficient "A" on the return signal is a measure of relative brightness. While the feedback configuration of FIG. 4 seeks to achieve a minimum output signal from the lowpass filters 340, with slight alteration a maximum lowpass filter output signal could instead be used, the output signal then representing brightness coefficient A. Such a configuration could be implemented using a signal 90° out-of-phase with the output from VPD 320 to modulate another copy of the output of the low noise amplifier 300. The average amplitude of the thus-modulated signal would be proportional to coefficient A in the incoming detected return signal.

Having completed describing applicants' former invention, various embodiments of the present invention will now be described, primarily with reference to FIGS. 9A–9C (category one), and FIG. 10 (category two). In the present invention, dedicated electronic mixers (such as were used in the earlier invention described herein in FIG. 4) are avoided, and instead quantum efficiency (QE) modulation techniques are used. These QE modulation techniques advantageously can accumulate detected signal charge, and are preferred over methods that attempt to directly measure high frequency, small magnitude detection photocurrent-generated signals.

Before categorizing QE modulation circuit topologies according to the present invention, it is useful to describe MOS diode behavior and how MOS diode quantum efficiency can be varied by bias potential and/or photogate potential. FIGS. 5A and 5B depict a portion of IC 210 and array 230, and depict a portion of a single photodiode detector 240, shown here fabricated on a p doped substrate 410. Photodiode 240 is shown with a depletion layer 420 having depth W, above which are found lightly doped and more heavily doped n regions 430 and 440. (The terms depletion layer and depletion region may be used interchangeably herein.) The n+doped region 440 serves as the photodiode anode, the connection to which is shown as 450. A p+doped region 460 formed at the upper region of substrate 420 serves as the photodiode cathode, connection to which is shown as 470. A depletion region 480 having depletion width W exists between—region 430 and p substrate region 410. (It is understood that doping polarities described herein may be inverted, and that structures may be fabricated on n substrate material rather than on the described p substrate material.)

The width W of depletion region 480 will vary or modulate with changes in reverse bias voltage coupled between the photodiode anode 450 and cathode 470. This bias potential is denoted Vr1 in FIG. 5A, and is denoted Vr2 in FIG. 5B. In FIGS. 5A and 5B, Vr2>Vr1, with the result that the width W of the depletion region increases.

Photons representing incoming optical energy, e.g., energy reflected from target object 20 perhaps, will fall upon photodiodes 240-x in array 230, e.g., see FIG. 3, among other figures. The photons can generate electron-hole pairs in the depletion region of these photodiodes and also in the quasi-neutral regions. These electron-hole pairs have a relatively long lifetime before recombining. Photons that generate electron-hole pairs in the depletion region advantageously have a much higher per photon photoelectric current contribution than photons that generate electron-hole pairs in the quasi-neutral regions of the substrate. This is because electron-hole pairs generated in the depletion region are quickly swept away by the electric field, and will strongly contribute to the resultant photocurrent. By contrast, electron-hole pairs generated in the quasi-neutral region remain there for some time and experience a greater probability of recombination without making substantial contribution to the photocurrent. It is seen that increasing the depletion region width W provides a larger region in which electron-hole pairs may be created and quickly swept away to contribute to the photocurrent, thus enhancing the quantum efficiency of the photodiode.

Those skilled in the relevant art will recognizes that depletion width W may be expressed as:

$$W = [2\epsilon \cdot (\psi_0 - V_R - V_B)]^{0.5} \{[qN_A \cdot (1 + N_A/N_D)]^{-0.5} + [qN_D \cdot (1 + N_D/N_A)]^{-0.5}\}$$

where $(V_R - V_B)$ is the reverse bias of photodiode 240, $N_A$ and $N_d$ are respective doping concentrations for the diode n and p regions, and $\psi_0 = V_T \ln(N_A N_D/n_i^2)$, where $V_T = kT/q = 26$ mV, and $n_i = 1.5 \cdot 10^{10}$ cm$^{-3}$.

Quantum efficiency (QE) modulation according to the present invention recognizes from the above equation that photodiode depletion width W can be modulated by varying the reverse bias coupled between the anode and cathode regions of the photodiode. This in turn permits varying the quantum efficiency (QE) of the photodiode, which can result in improved detection sensitivity for the overall system. Table 1 depicts exemplary data for a discrete PIN photodiode exposed to a fixed level of illumination, and shows measured photodiode current as a function of reverse bias voltage coupled to the photodiode. Data for a CMOS-implemented photodiode may of course differ from what is shown in Table 1.

TABLE 1

| Reverse voltage (VDC) | Photodiode current (mA) |
|---|---|
| 0.2 | 0.09 |
| 0.5 | 0.38 |
| 1 | 0.83 |
| 2 | 1.4 |
| 3 | 1.51 |
| 4 | 1.62 |
| 5 | 1.7 |
| 6 | 1.66 |
| 7 | 1.76 |
| 8 | 1.8 |
| 10 | 1.8 |

Note in Table 1 that for the exemplary PIN photodiode, magnitude of the photodiode current (e.g., photocurrent) varies by a factor of four as the reverse bias is changed between 0.5 VDC and 2 VDC.

Modulating the photodiode reverse bias is a mechanism by which QE can be varied to improve detection sensitivity of photodiodes in an array. However, an even more efficient implementation of a QE modulation detector uses a photogate structure. In such embodiment, the photodiodes preferably are implemented as photogate MOS photodiodes whose QE is modulated by varying potential coupled to the gate of the photogate structure.

Figure 6A:
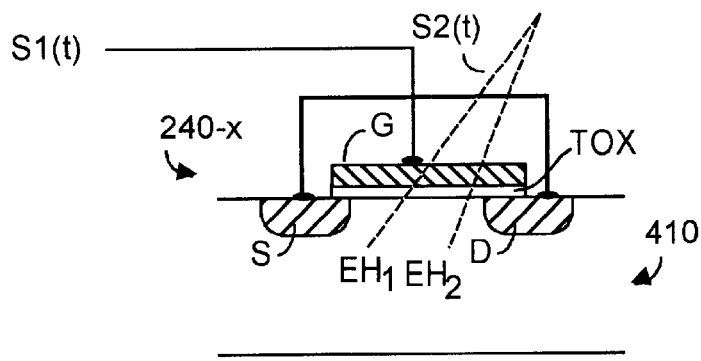
FIGS. 6A and 6B depict a photogate photodiode that may be QE modulated by varying gate voltage, according to the present invention.
Figure 6B:
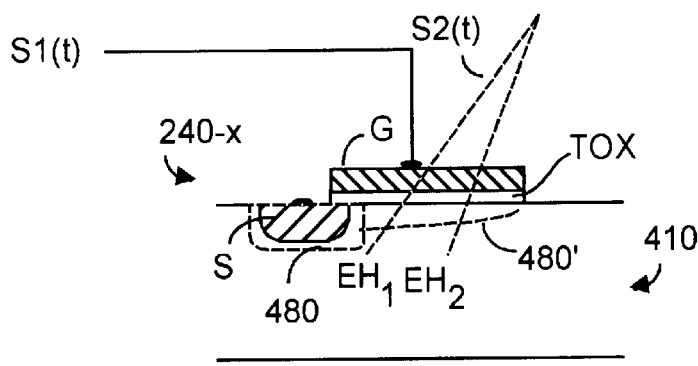

Referring now to FIGS. 6A and 6B, assume that substrate 410 is p-type material, and that MOS-type source and drain regions, respectively S and D, are formed with n-doped material, although as noted earlier doping polarity types could of course be reversed. Assume too that source S and drain D are connected together, as shown in FIG. 6A. When the voltage S1 (t) coupled to gate G is high, device 240-x will deplete and then invert, again assuming an n-channel device. In this configuration, gate G and underlying thin oxide (TOX) are assumed substantially transparent to incoming photon energy S2(t). This condition may be met if the polysilicon material used to form gate G is not polycided.

Referring to FIGS. 6A and 6B, gate structure G is substantially transparent to incoming optical energy shown as S2(t). The structure shown in FIG. 6A includes both source and drain regions, denoted S and D. By contrast, the structure of FIG. 6B is formed without the drain structure, to improve quantum efficiency modulation. In FIG. 6A, since the source and drain regions are connected together, device 240x can operate without a drain region, as shown in FIG. 6B. As noted, MOS fabrication processes preferably are used to implement IC 70, upon which the present invention may be implemented. With many MOS fabrication processes, the drain region of device 240x may be omitted as shown in FIG. 6B. Omitting the drain region effectively increases relative variation in the device collection efficiency between the low sensitivity operating state and the high sensitivity operating state. As described below, changing bias of the optically transparent gate potential changes shape of the depletion layer: a layer 480 substantially confined about the source region is present when the gate bias is low, which depletion layer region 480' extends substantially under the gate region when the gate bias is high.

Photocharges, e.g., EH1, EH2, etc. are generated in the substrate under the gate region in response to photon energy S2(t). If no channel exists under the gate region, then most of the photocharges will be lost, and only the source and drain regions will collect photocharge. But if the region under the gate is inverted and/or depleted, then generated photocharges can be captured and swept into the source and drain regions. This effectively increases efficiency of the photon collecting structure 240-x. The increase in collection efficiency is roughly proportional to the ratio of area under gate G and the area of the source and drain regions, S and D. If photogate devices 240x are properly sized, this ratio can be 10:1 or greater. The increase in efficiency occurs abruptly, with the efficiency suddenly increasing when the voltage S1(t) exceeds a threshold level. If the channel area is undoped and substrate doping is above $10^{17}$, the threshold will be about 0 V, such that the photogate photodetector 240x is in low sensitivity mode at a gate voltage of about −0.1 V and in a high sensitivity mode when the gate voltage is about +0.1 V. It will be appreciated that a relatively small change in gate voltage can bring about a substantial change in sensitivity of the device.

Figure 6C:
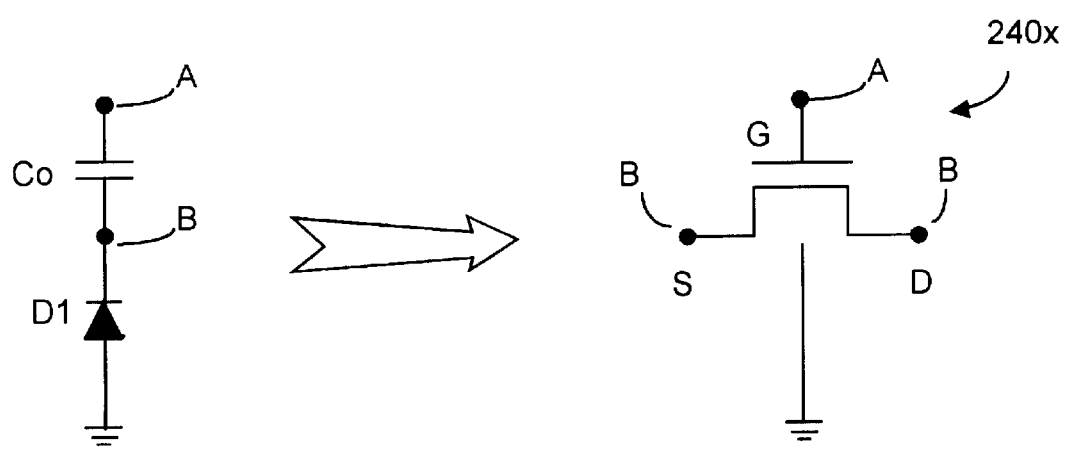
FIG. 6C depicts approximate equivalency between an MOS-type photodiode series-coupled to a capacitor, and a photogate photodiode such as shown in FIG. 6A, according to the present invention.

FIG. 6C depicts the approximate circuit equivalency between a photogate photodiode 240X and a more conventional MOS photodiode D1 coupled to a capacitor $C_O$. Understandably, voltage levels for MOS photodiodes may differ from voltage levels for photogate photodiodes. Thus, it will be appreciated that the term photodiode or photodetector or pixel detector 240x may be understood to include a photogate photodiode such as described above with respect to FIGS. 6A–6C. Similarly, the various circuits and analyses for QE modulation described herein with respect to a more conventional MOS photodiode may also be understood to be practicable with a photogate photodiode 240x, such as described above. For ease of illustration, most of the embodiments herein are described with reference to a MOS-type photodiode detector rather than a photogate detector, however either type detector may be used.

Figure 7A:
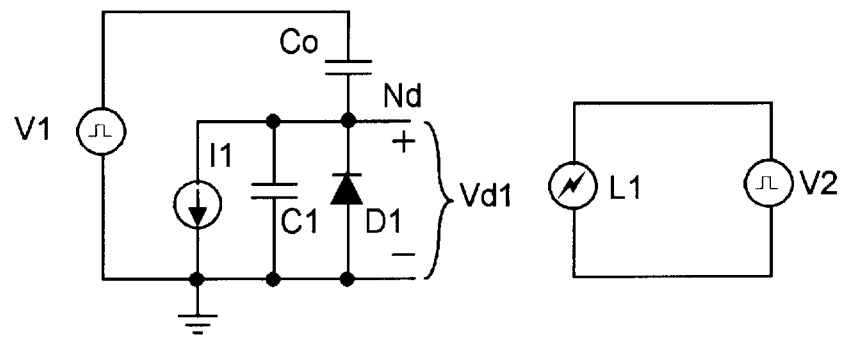
FIGS. 7A and 7B depict the equivalent circuit and voltage bias configurations for the exemplary photodiode of FIGS. 5A and 5B and show, respectively, high-side and low-side QE modulation, according to the present invention.
Figure 7B:
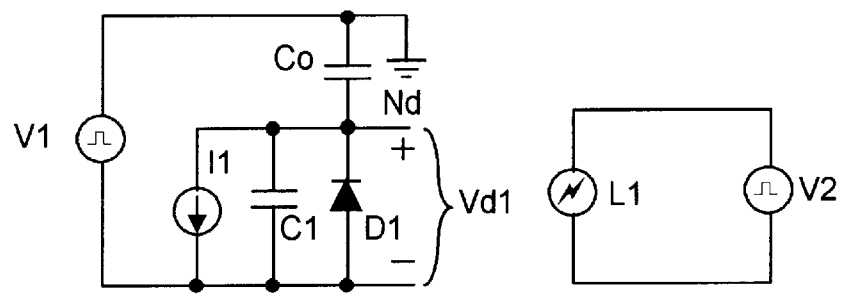

FIGS. 7A and 7B depict the equivalent circuit of a photodiode detector 240, which is denoted D1 and includes a parasitic shunt capacitor $C_1$. FIG. 7A may be referred to as depicting high-side QE modulation in that the modulation signal is coupled via capacitor $C_O$. In FIG. 7B, the modulation signal is coupled via capacitor C1 and the figure may be said to depict low side QE modulation. In FIG. 7B, capacitor Co is generally located within an amplifier (not shown) in the electronics associated with pixel detector D1.

In the right hand portion of FIG. 7A, an excitation source V2 is coupled to a light emitter L1, e.g., a laser diode or an LED, so as to cause L1 photoemission that is proportional to V2. In the left hand portion of FIG. 7A, photodiode D1 receives such photon energy from L1, and a photocurrent l1 is induced in response. It is understood that photodiode D1 (e.g., photodiodes 240-x in array 230) will be reverse biased, and bias source V1 will thus include a voltage offset. Alternatively, photodiode node $N_d$ can be pre-charged during initialization, before detection of an incoming signal. It will be appreciated that V2 in FIGS. 7A and 7B may be analogous to periodic waveform generator 225, and that L1 may be analogous to optical energy emitter 220 (see FIG. among other figures).

In FIGS. 7A and 7B, photodiode reverse bias voltage and hence the QE of the photodiode is modulated by bias source V1. In FIG. 7A, the reverse bias voltage is given by $Vd1=V1 \cdot (C_0)/(C_0+C_1)$, where $C_0$ is series-coupled between V1 and D1. From Table 1 and FIGS. 5A and 5B, a large magnitude V1 represents a larger reverse bias that can advantageously increase the width W of the photodiode depletion region. This in turn increases sensitivity of photodiode D1 (or 240), with the result that photodiode current l1 increases in response to incoming photon energy from L1 (or incoming photon energy reflected from a target object 20).

If excitation source $V_2$ and bias source $V_1$ operate at the same frequency (ω), the total charge provided by current source $I_1$ per cycle is maximized when $V_1$ and $V_2$ are in phase, e.g., when magnitude of $V_1(\omega t)$ and $V_2(\omega t)$ are high simultaneously. This results because photodiode sensitivity will be maximum when incoming photon energy is at the highest magnitude, or brightest intensity. Conversely, if D1 sensitivity is minimal when the incoming photon energy is maximum, then the amount of charge sourced per cycle by $I_1$ is minimized.

The change in amount of charge $\Delta Q_N$ on photodiode node $N_d$ after a given number of cycles will be the amount of charge sourced by $I_1$ during those cycles. The change $\Delta Q_N$ can be determined by measuring the difference in voltage $\Delta V_D$ on node $N_d$ before and after capacitors $C_0$ and $C_1$ have been discharged by the photocurrent I1. Normally photocurrent I1 is very small and difficult to measure directly. However its accumulated effect over a large number of cycles results in a measurable voltage change $\Delta V_D$.

If the photodiode anode and cathode terminals can each be set to an arbitrary voltage in FIG. 5B, then the upper lead of $C_0$ can be at ground potential, as shown in FIG. 7B. As described later with respect to several embodiments, typically node $N_d$ is coupled to an amplifier input that also has a shunt capacitor coupled to the same input node. An advantage of the configuration of FIG. 7B is that the parasitic shunt capacitance of the amplifier can be used as $C_1$ in lieu of an additional or dedicated shunt capacitor. So doing can reduce parts count and reduce the area required to implement the present invention on an IC chip. Furthermore, this configuration produces less noise and less susceptibility to variations in production technology.

When photon energy falls upon a photodiode, there is a time lag between arrival of the incoming photon energy and collection of freed electrons. This time lag increases substantially with optical energy wavelength, and can be on the order of a few ns for wavelengths of about 850 nm. Accordingly, optical energy emitter 225 may be selected to emit smaller wavelengths such that photodetectors 240-x in array 230 have more rapid response and may be QF modulated at higher frequency ω.

Understandably, it is desired that photodetectors used in the various embodiments of the present invention detect not only efficiently, but rapidly as well. Use of a light emitter 220 to transmit optical energy of relatively shorter wavelength can promote detector efficiency, but such emitters are more expensive to fabricate than emitters that provide longer wavelength energy. For example a relatively inexpensive laser diode may be used as emitter 220 to transmit energy of perhaps 850 nm wavelength. While such an emitter is relatively inexpensive, the longer wavelength will penetrate more deeply into the structure of the pixel detectors, e.g., at least 7 μm, with resultant loss of quantum efficiency and slow response.

Figures 7C, 7D:
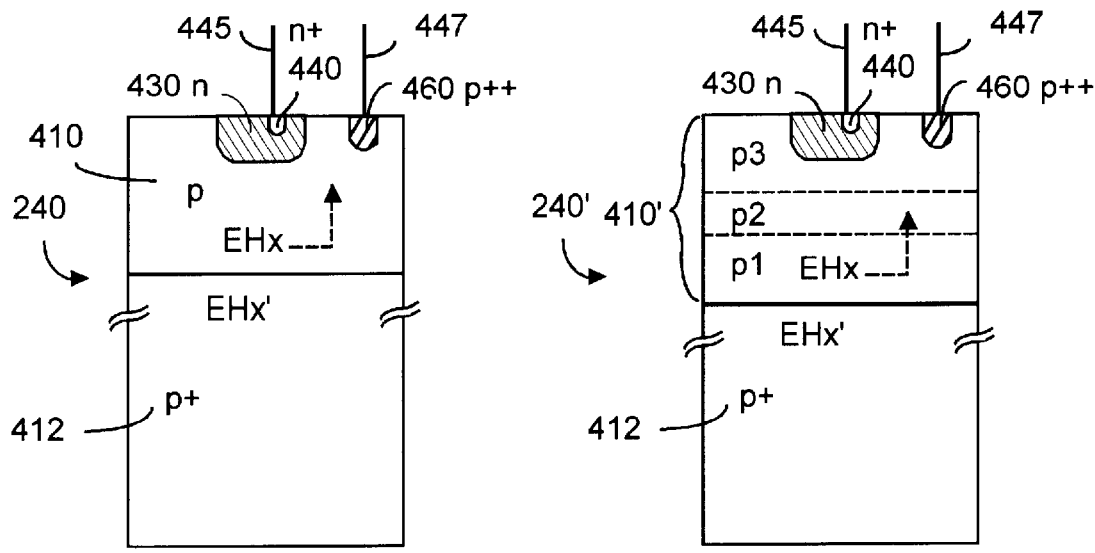
FIG. 7C is a cross-section of an exemplary photodetector structure illustrating how photon-energy created charges may be recovered using current, according to the present invention.
FIG. 7D is a cross-section of an exemplary photodetector structure showing smooth or discrete variation of epitaxial layer dopant concentration, illustrating how photon-energy created charges may be recovered using current, according to the present invention.

Referring now to the exemplary CMOS structure of FIG. 7C, quantum efficiency suffers because much of the incoming photon energy reflected by the target object 20 will create electron-hole pairs (EHx) deep within the epitaxial region 410 of the pixel photodetectors 240, and may also create electron-hole pairs EHx' more deeply in the structure, in region 412. Unfortunately, many of these deeply-freed electrons will be unable to reach the surface region of the photodiode detector where they can be collected and would thus contribute to the photodiode detection signal current. Further, use of longer wavelength energy also produces an undesired time delay before signal current is generated. The delay, typically a few ns, occurs because diffusion effects predominate over drift effects in collecting such deeply-freed electrons as may contribute to the detection photodiode current.

If somehow the electrons associated with EHx, EHx', were moved closer to surface region of the photodiode structure, then drift effects would predominate over diffusion effects, and the detection current would be seen sooner. Because doping of epitaxial layer 410 is very low, it is possible to move electrons created deep within the epitaxial layer using relatively small currents.

Referring to FIG. 7C, epitaxial layer 410 is typically on the order of 7 μm thick with a dopant concentration of about $N_A=10^{15}/cm^3$, and underlying heavily doped substrate region 412 is on the order of several hundred μm thick, and has a dopant concentration of about $N_A=10^{18}/cm^3$. Structures such as shown in FIG. 7C are readily available from many commercial vendors.

In FIG. 7C, an n-well region 430 and a p++ region 460 are defined in the epitaxial layer 410. N+ region 440 is formed with the n-well region 430. As described below, collection leads 445, 447 are provided to facilitate moving 20 the deeply-free charges around and preferably in an upward direction for collection by n-well 430. (It is understood that the dopant polarities described could be reversed, e.g., an n-type substrate might instead be used, and that dopant levels and structure thicknesses may also be modified.)

What will now be described is a method by which charges associated with EHx may be moved upward to enable their eventual collection by n-well 430 due to diffusion current, once the charges are in sufficiently close proximity to the n-well. The goal is to urge deeply-freed electrons upward sufficiently slowly to be collected by lead 445 associated with the n-well, but not by lead 447 associated with the p++ region. While the method to be described can successfully collect electrons associated with electron-hole pairs EHx, the method cannot reach more deeply into the structure to also collect electrons associated with EHx'. Such movement is shown by the phantom right-angle line in FIG. 7C. To attempt to also recover the EHx' electrons would require an unacceptably large current due to the high dopant level associated with layer 412.

Consider now magnitude of electrical current required to move electrons according to the present invention. Assume that, when viewed from the top, the structure shown in FIG. 7C is a square of dimension 1 $\mu$m ×1 $\mu$m, whose area is denoted $A_s$. For a 7 $\mu$m region 410 thickness, the resultant volume is $7 \times 10^{-12}$/cm$^3$. The requisite charge that must be removed from such a volume is $10^{15} \times 10^{-8} \times 7 \times 10^{-4} \times 1.6 \times 10^{-19} A_s = 1.12 \times 10^{-15} A_s$, where $1.6 \times 10^{-19}$ is the charge associated per electron. If the goal is remove this much charge within, say, 1 ns, then the required current is about 1.12 $\mu$A. While this current is not negligible, it is indeed feasible to provide this current for each square micron associated with photodetector array 230. For an array sized 1 mm×1 mm, modulated at 200 MHz, total current would be on the order of a 200 mA to move electrons upward 7 $\mu$m. It will be appreciated that the high dopant level associated with substrate region 412 precluded attempting to recover electrons from EHx' using this method.

Thus, one approach to somehow moving deeply-freed electrons from layer 410 upward for collection is to sweep substantially all holes downward by about 7 $\mu$m. Since electron and hole mobility are reasonably close, such freed electrons will be moved upward at least 7 microns and can come in sufficiently close proximity to n-well region 430 to be favorably influenced by the depletion region therein. The depletion region influence will promote collection of such deep-freed electrons higher in the structure.

By establishing a preferably pulsed current below n-well region 430, holes can be made to move downward by about 7 $\mu$m, while electrons will be made to move upward by at least the same distance due to their higher mobility. As noted, once the electrons come sufficiently close to be influenced by the electric field setup by the depletion region within the n-well region, the likelihood of collecting the electrons can be substantially enhanced.

In one embodiment, ohmic contact 460 is formed on the substrate outside n-well region 430 and is used to help bring electrons close to the depletion layer. This approach can work well in that the epitaxial layer 410 has a relatively low dopant concentration, and the magnitude of charge required to sweep electrons upward by about 7 $\mu$m is acceptable. There is no incentive to encourage upward movement of electrons by more than about 7 $\mu$m as there would be too many holes in the more heavily doped regions encountered at the upper levels of structure 210. If desired, rather than form an ohmic contact, an AC-coupled approach using a capacitor structure could instead be used.

A detector structure employing various types of epitaxial region doping gradients will now be described. FIG. 7D depicts a structure that may be similar to that of FIG. 7C, although the depth of structure 240' in FIG. 7D may be deeper than about 7 $\mu$m. In FIG. 7D, the epitaxial layer 410' preferably defines different dopant concentrations that range from a relatively high concentration (p1) to a lower concentration (p3). The dopant concentration transition may be a continuum, or may be more discrete, e.g., by forming separate epitaxial layers, each having an associated dopant concentration.

Those skilled in the art will recognize that there exists an electric field that is associated with each doping region boundary. For structure 240' in which dopant concentration is weaker nearer the upper surface of the structure, the direction of the electric field may be defined as being downward. Electrons in EHx' near the upper surface of region 412 will move upward through the interface existing between regions 412 and p1 due to the electric field at that interface. Since these electrons will not move downward through that interface, there is an excellent probability that they can be induced to quickly move upward (by diffusion effects) close to the next epitaxial doping interface (p1, p2), from whence they can again be induced to move into the next dopant region, here p2, due to the electric field existing at p1, p2. Once in that (less highly doped) epitaxial region (here, p2) the electrons again will no longer move downward through the p1, p2 interface, and have an excellent chance of moving upward to be influenced by the next epitaxial region (p3), from whence they can be induced to move into that region, and so forth.

Understandably the same above-described phenomenon works for electrons initially from pairs EHx that were initially freed somewhere in the epitaxial region. It is also understood that fewer or more than three dopant concentrations or regions may be defined within the epitaxial region.

Thus, a drift current phenomenon associated with the electric fields in the various p1, p2, p3, . . . interface or boundary regions comprising the epitaxial layer induces the electrons to move quickly upwards through each of the p1, p2, . . . interface regions.

As above-described, discretely doped epitaxial regions serve somewhat as "staging" or "holding" regions for electrons that have come sufficiently close to be moved into the region. However if a continuum of dopant gradient can be defined throughout the epitaxial region 410', there would be no "holding time" within a region (since separate epitaxial regions would not per se exist). The effect would be to more quickly capture and sweep upward freed electrons for collection by n-well 430.

The following section will now describe differential QE modulation, and the advantages that it can provide. Again, QE modulation including differential QE modulation may be practiced using convention MOS-type photodiode detectors and/or photogate detectors.

Referring again to FIGS. 5A and 5B, assume that incoming photon energy generates electron-hole pairs within the substrate of the photodiode shown, including an electron-hole pair $EH_1$ generated at an arbitrary location "X". In FIG. 5A, location X is in the quasi-neutral region and not in the depletion region (shown cross-hatched). In the present invention, it is desired that modulation reduce QE at this point in time and discard as many electron-hole pairs as possible, including $EH_1$. If the photodiode QE is then immediately increased, e.g. by increasing photodiode reverse bias, the depletion region width W can increase to encompass location X (see FIG. 5B).

In FIG. 5B, $EH_1$ is still lingering at location X, which is now in the depletion region, and $EH_1$ will now contribute strongly to the photocurrent. On one hand, the increased depletion region in FIG. 5B can enhance photon detection sensitivity. But electron-hole pairs generated when photons arrive when QE should be low (FIG. 5A) can contribute to the total photodiode current when QE should be high (FIG. 5B), e.g., the contribution is at a different point in time. The undesired result is an inability to change the effective QE at high modulation rates. But what is desired is that only photons arriving at a high QE time should contribute to the photocurrent at any time.

It is desirable to achieve faster photodiode QE modulation by removing the above-described time lag effect. It is further desirable to remove common mode effects in the photodiode output signal resulting from ambient light and from so-called photodiode dark current. Overall, it will now be appreciated that QE modulation essentially modulates the size of the collection target for electrons within the photodiode structure. Absent another collection target, most electrons would eventually be collected by even a small target due to their relatively long lifetime. Thus, QE modulation in terms of change in numbers of electrons will be substantially smaller than the change in target area.

Various aspects of the present invention will now be described that use differential QE modulation techniques in which the collection target size is increased and decreased, while the alternative adjacent target size is decreased and increased. The effect is to provide a larger alternate target to electrons or holes, while reducing the target area of the given photodiode. This enhances QE as the electrons will be collected by the alternative target and taken out of circulation for the reduced target, well before the end of their lifetime.

Figure 8A:
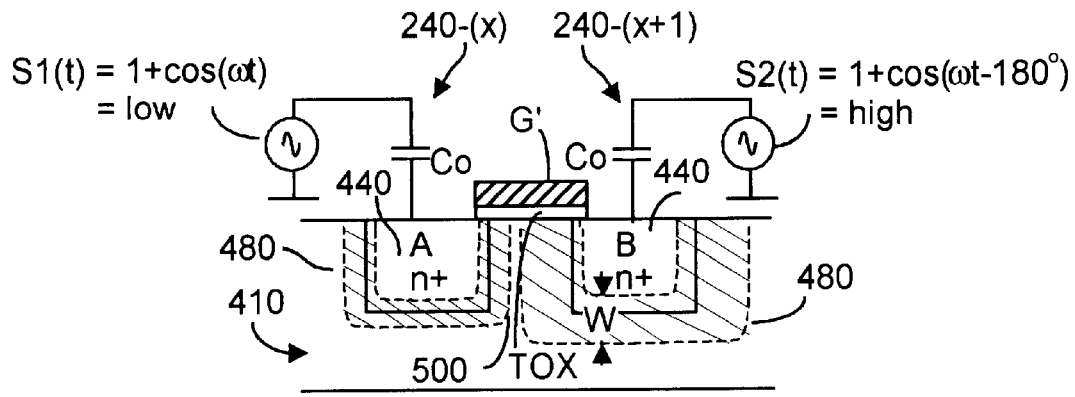
FIGS. 8A and 8B are side cross-sectional views of two adjacent photodiodes with a leakage-reducing gate QE modulated 180° out of phase, according to the present invention.
Figure 8B:
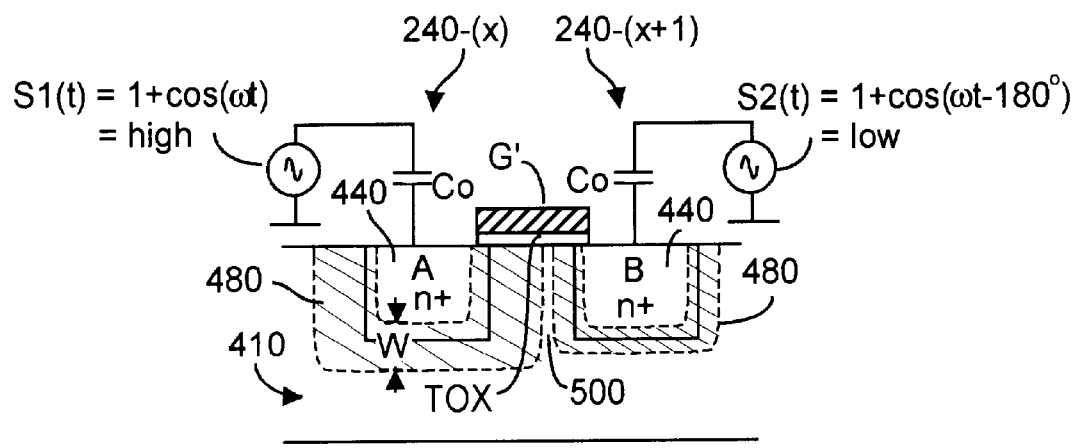

During QE modulation, the present invention recognizes that some regions within a photodiode, typically within the more lightly doped region of the junction, alternate between quasi-neutral and depletion regions. If these regions can be kept to a minimum, the photodiode can be more sharply QE modulated. Such enhanced QE modulation is promoted using a differential modulation approach, as will be described later herein with respect to FIGS. 8A and 8B. FIGS. 8A and 8B represent "snapshots" in time of two adjacent photodiodes, denoted A and B, 180° apart. Preferably within array 230, adjacent photodiodes A and B are sufficiently close together and small in surface area such that each receives substantially the same amount of incoming photon energy at any given time. Photodiodes groups or banks A and B are bias-modulated such that their respective QE are 180° out of phase, i.e., QE of photodiode A reaches a maximum when the QE of photodiode B is at a minimum, and vice versa.

Note in FIGS. 8A and 8B that the quasi-neutral region 500 between adjacent photodiodes A and B is always quite small, and hence the number of electron-hole pairs created therein will be quite small. This is advantageous since it is the quasi-neutral region near the depletion region that reduces QE modulation. In FIG. 8B, electron-hole pairs in quasi-neutral region 500 between diodes photodiodes A and B may be swept into the photocurrent for adjacent photodiode B when QE for photodiode B is increased. Because quasi-neutral region 500 is small, degradation of QE modulation due to region 500 will advantageously be small.

Assume in FIGS. 8A and 8B that at a given time photodiodes A and B are reverse biased at 0 VDC and 2 VDC, respectively. As an example, if A and B are fabricated with reasonable CMOS 0.25 μm processes, photodiode B typically will measurably convert up to 30% more photon energy than photodiode A. The QE of photodiode A goes up rapidly from 0 VDC with small increases in reverse bias, whereas the QE of photodiode B reverse biased at say 1 VDC will be almost unaffected by a small change in reverse bias. Thus, it is advantageous for maximum QE modulation that reverse bias of photodiode A be as low as possible. This bias regime corresponds to a MOS transistor whose channel is formed in the quasi-neutral region 500 between photodiodes A and B. The MOS transistor gate structure is non-existent but may be assumed to be present at some voltage in sub-threshold regions with a high source-drain voltage.

During the time frame shown in FIG. 8A, photodiode A is weakly reverse biased. As a result, substantial leakage current can exist between photodiodes A and B, which would correspond to sub-threshold leakage of a MOS transistor whose source is photodiode A and whose drain is photodiode B in FIGS. 8A and 8B. Such leakage current may be reduced by forming a polysilicon gate G', assumed transparent to optical energy of interest, at least over the region between photodiodes A and B, with an insulating layer of thin oxide (TOX) beneath gate G'. If such a gate is fabricated, sub-threshold leakage current can be controlled by controlling the gate voltage. For example, each 0.1 mV of gate voltage corresponds to a ten-fold change in leakage current. For an undoped channel, a gate voltage of about −0.4 VDC is typically sufficient to substantially reduce leakage current.

Figure 8C:
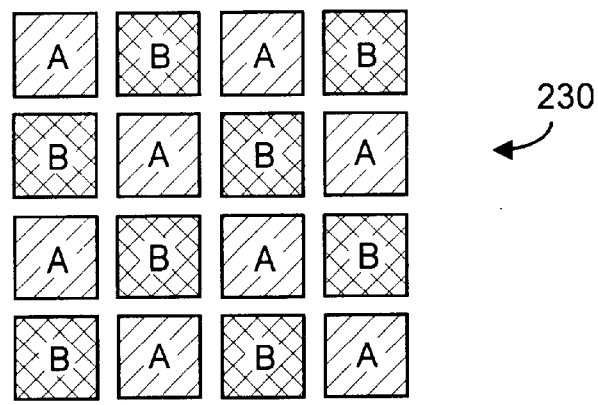
FIG. 8C is a top view of an array of photodiodes wherein modulation nodes for alternating banks of photodiodes are coupled in parallel for QE modulated complementarily to the remaining banks of photodiodes, according to the present invention.

FIG. 8C is a top view of a portion of array 230 depicting rows and columns of photodiodes, here labeled as either photodiodes A or photodiodes B. As suggested by the different cross-hatching, QE modulation nodes for all photodiodes A are coupled together in parallel, and QE modulation nodes for all photodiodes B are coupled together in parallel. Essentially, FIG. 8C may be seen as a top view of one large photodiode A and one large photodiode B. In a differential QE mode of the present invention, all photodiodes A can be modulated with a phase 180° from the signal that modulates all photodiodes B. Both classes of photodiodes, e.g. A and B, will have their respective QE sharply modulated because only a very small quasi-neutral region will exist between them. It is substantially only the quasi-neutral region at the bottom region of each photodiode that causes significant smearing of the QE modulation at high modulation frequencies.

Having presented an overview of concepts underlying QE modulation, various configurations of systems employing such techniques will now be described. In a first category of embodiments, the present invention uses variable phase delay (VPD) techniques in which dedicated electronic mixers (e.g., Gilbert cells) mixers are replaced by QE modulation. System topography depicting the first category is found primarily in FIGS. 9A–9C. A second category provides embodiments that mix with fixed phase delays using QE modulation, and implements a variety of spatial and temporal multiplexing approaches. System topography depicting the second category is found primarily in FIG. 10.

Advantageously, either category of embodiments can modulate QE of MOS-implemented photodiodes by changing photodiode reverse bias, or by providing MOS-implemented photodiodes with a photogate, and then changing the gate voltage. Single-ended or double-ended differential signal processing may be employed with both methods. Differential QE modulation advantageously allows faster QE modulation, and provides a differential output that substantially removes common mode effects due to ambient light and photodiode dark current. Both categories can advantageously accumulate photodetector signal charge on a photodiode capacitor. Each category can examine charge periodically when QE modulation is stopped. Such signal accumulation approaches are preferred over methods that seek to directly measure a high frequency small magnitude photocurrent.

FIGS. 9A–9C will now be described with respect to various variable phase delay (VPD) QE modulation embodiments of the present invention, so-called category one embodiments. Using VPD techniques, photocurrent from each QE-modulated pixel photodiode (or photogate photodiode) is coupled as input to an associated relatively high input impedance amplifier that need not exhibit high bandwidth, high frequency response, or high closed-loop gain. The amplifier output feeds directly to a low pass filter (LPF) whose output drives an integrator. The integrator output is coupled as to control phase of the variable phase delay (VPD) that controls QE modulation signals that drive the photodetector diodes. The VPD is also driven by a signal from the periodic signal generator that controls the optical energy emitter. There may or may not be a DC offset associated with the output signal from the pixel photodiode detectors and with the homodyne drive signal. Assuming no offsets, at steady-state the LPF output will be zero. Assuming appropriate DC offsets, at steady-state the LPF output will be a minima or a maxima. This method may be implemented single-ended, or preferably double-ended using a complementary approach in which positive and negative signals are derived from photodiodes that are QE modulated out of phase.

For ease of illustration, explicit biasing of photodiode (or photogate) detectors is not shown. Those skilled in the art will recognize that providing biasing may be as simple as coupling a resistor from a reference source to a node on the various photodetectors for single-ended and for differential mode QE modulation. More preferably, in the case of differential QE modulation, feedback would be provided to a common mode biasing reference to ensure that the sum of the two signals being compared remains within a desired dynamic range.

Referring now to FIG. 9A, a category one variable phase delay (VPD) embodiment will be described. FIG. 9A depicts a portion of IC 210, array 230, pixel detectors 240-1 through 240-x, and each diode's associated exemplary electronics 250'-1 through 250'-x. Elements in FIG. 9A that bear like reference numerals to elements in earlier figures herein may, but need not be, identical. For example, variable phase delay unit 320 or filter 340 in FIG. 9A may, but need not, be identical to the same components in FIG. 4. Each pixel diode 250-x in FIG. 9A has an associated electronic circuit, denoted 250-x (as contrasted with the notation 250'-x for FIG. 4). Again for ease of illustration, only two out of perhaps many thousands of pixel diodes 240 and associated electronic circuits 250 are depicted. Again, if desired a dedicated A/D converter can be provided as part of each electronics circuit 250-1 through 250-x, as opposed to implementing an omnibus A/D function on IC chip 210.

Comparing the configuration of FIG. 9A with that shown in FIG. 9A, it is seen that whereas FIG. 4 provided each pixel diode with a dedicated electronic mixer 310, no such separate or explicit mixers are included in electronics 250-x in FIG. 9A. Instead, according to the present invention, the configuration of FIG. 9A uses QE modulation to derive phase difference between transmitted and received signals, and to derive TOF, among other data. FIG. 9A and other QE modulation embodiments described herein advantageously avoid mixers and their need for a sufficiently amplified signal to be input for mixing.

In FIG. 9A, the detected waveform signal photodiodes 240-x in array 230 will include a DC-offset of the form $1+A\cdot\cos(\omega\cdot t+\phi)$, such as shown in FIG. 2C. The $1+A\cdot\cos(\omega\cdot t+\phi)$ signal will preferably have a minimum value of 0 VDC and a maximum value of perhaps +3 VDC. As noted earlier with respect to FIG. 2C, the change of notation to include an arbitrary DC-offset will not impact the relevant mathematical analysis.

In FIG. 9A, the output signal from variable phase delay (VPD) 320 is coupled via capacitor $C_O$ to node $N_d$ of the associated photodiode 240-x, for each electronics system 250-x in array 230. When $C_O$-coupled modulation signal is in phase with the detected light energy, e.g., $S_2=A\cdot\cos(\omega t+\phi)$, the signal developed across amplifier 400's input impedance $R_i$ will be maximum. $R_i$ is large, e.g., $>1$ G$\Omega$, and the signal voltage across $R_i$ will build-up in magnitude slowly over a large number of cycles of the periodic signal $\cos(\omega t)$. The feedback path within each electronics 250-x includes low pass filter 340 and integrator 330, and the resultant feedback seeks to minimize magnitude of amplifier 400 input, e.g., the voltage across $R_i$. Minimal amplitude across $R_i$ occurs when signal $S_2=A\cdot\cos(\omega t+\phi)$ received by the photodiode 240-x is 180° degrees out of phase with the modulating signal $\cos(\omega t+\psi)$. As shown in FIG. 5, for each electronics 250-x, a resultant phase value $\psi_x$ can be read-out as a voltage signal at the output of each integrator 330.

Thus electronics 250-x in FIG. 9A functions somewhat similarly to electronics 250'-x in FIG. 4 to examine incoming periodic photon energy signals, and to produce a phase output signal from which distance z from the system to a target object 20 may be measured. In FIG. 9A, each amplifier output is passed directly to the input of low pass filter 340, and thus a high frequency response for amplifiers 400 is unnecessary. Moreover, the voltage signal across each amplifier input impedance $R_i$ is allowed to build-up over a large number of periodic cycles. Thus, the final signal to be detected will be relatively large, e.g., preferably many mV or tens of mV. As a result, unlike amplifiers 300 in FIG. 4, in the embodiment of FIG. 9A, amplifiers 400 need not be very high gain, very low noise, high frequency devices. As a result, amplifiers 400 can be implemented in less IC chip area and will consume less current, yet can help provide better z-distance resolution than the more complicated configuration of FIG. 4.

Turning now to FIG. 9B, an additional category one VPD embodiment is depicted. In FIG. 9B, complementary, 180° out of phase, outputs from VPD 320 are employed, in which one VPD output is coupled via a capacitor $C_O$ to an associated photodiode D or 240-x. The complementary VPD output is coupled via a similar capacitor $C_{10}$ to a similar photodiode, here denoted D'. Thus, photodiode 240-x is QE modulated by one VPD output, whereas diode D' is QE modulated 180° out of phase by the other VPD output. In essence, QE modulation nodes for various photodiodes are parallel-coupled such that groups of photodiodes are parallel QE modulated. Photodiodes 240-x and D' each discharge, and there will be a common mode signal requiring that reverse bias voltages to each photodiode be refreshed periodically to a predetermined level. Further, the configuration of FIG. 9B uses differential inputs to amplifiers 400', the effects of ambient light falling upon photodiodes 240-x in array 230 are minimal. An additional advantage provided by the configuration of FIG. 9B is that photodiodes 240-x and associated photodiodes D' can be implemented with a differential structure that enables rapidly modulating QE for the diodes sets without significant lag. Thus, for each photodiode 240-x in array 230, a photodiode D' having substantially identically characteristics will be coupled to the inverting input (in the configuration of FIG. 9B) of each amplifier 400'.

Turning now to FIG. 9C, a VPD QE modulation embodiment employing differential comparators and digital integrators is shown. Again it is understood that QE modulation nodes for various photodiodes are parallel-coupled such that photodiodes can be parallel QE modulated. In FIG. 9C, amplifiers 400' and typically analog integrators 330 of FIG. 9B are replaced with differential comparators 510, and with digital integrators 520. At regular intervals, microcontroller 260 (see FIG. 3) will command energy emitter 220 to halt emission, or to shut down, and both outputs of VPD 320 will be set to a constant voltage. Each differential comparator 510 then compares the differential signals presented to its input nodes. Each digital integrator 520 then reads the result (C) of this comparison, and increments its digital output by a small amount if C=1 and reduces its output by a small amount if C=0. If desired, comparators 510 can be shut down when the photodiodes are being modulated, during which times voltage comparisons are not required.

Referring still to FIG. 9C, consider the following example. At steady-state, the output signal from digital comparator 510 will toggle between "0" and "1". The output from digital integrator 520 will continue toggling between two values, e.g., 5 and 6. VPD unit 320 will produce delays, toggling between 5 and 6 (in the present example). Photodetector D will continue to be modulated with a signal that toggles between cos(ωt+5) and cos(ωt+6). In the above example, if values 5 and 6 are sufficiently close, at equilibrium it will appear as though photodiode D were being modulated by cos(ωt+5.5).

So-called category two embodiments employing fixed phase QE modulation will now be described primarily with reference to FIG. 10. In category two embodiments, fixed phase signals are used to QE modulate each photodetector. Different groups or banks of photodiode detectors may be defined in a non-localized manner within the array. For example, a first bank of photodiode detectors may be QE modulated with fixed 0° phase shift, a second bank may be QE modulated with fixed 90° phase, shift, a third bank with fixed 180° phase shift, and a fourth bank with fixed 270° phase shift. Within each pixel, there are photodiode detectors that correspond to every one of the four banks. Phase information and target object brightness information can be determined by examining output values for each bank within a pixel. This fixed delay approach simplifies the electronic circuitry associated with each pixel, reduces power consumption, can reduce IC chip area requirement, and enables a range of techniques for temporal and spatial multiplexing.

Various aspects of category two QE modulation will be described including spatial and temporal multiplexing, which multiplexing may be single-ended or differential, as well as none one-to-one mapping between physical photodetectors and pixels. Further, category two embodiments can employ an inductor to reduce power consumption by tuningout or compensating for capacitive losses.

Category two fixed phase delay QE modulation will now be described with reference to FIG. 10. An advantage of this configuration is that electronics 250-x can be somewhat simplified and, as in other QE modulation embodiments, a brightness measurement can be output. In FIG. 10, photodiodes 240-x and D' in array 230 are modulated with a fixed phase modulator 530 whose output is selectable, e.g., by microcontroller 260 (see FIG. 3) to be 0° phase or 90° phase. Software that may be included within memory 270 preferably corrects for the (fixed) modulation phase differences between pixel photodiodes due to path delays to the pixels. The modulating signal and its complement may be provided to pixel array 230, or the complement may be regenerated within each pixel electronics 250-x by including a 180° delay unit 540 coupled to the single output of a fixed phase delay unit 530.

Figure 10:
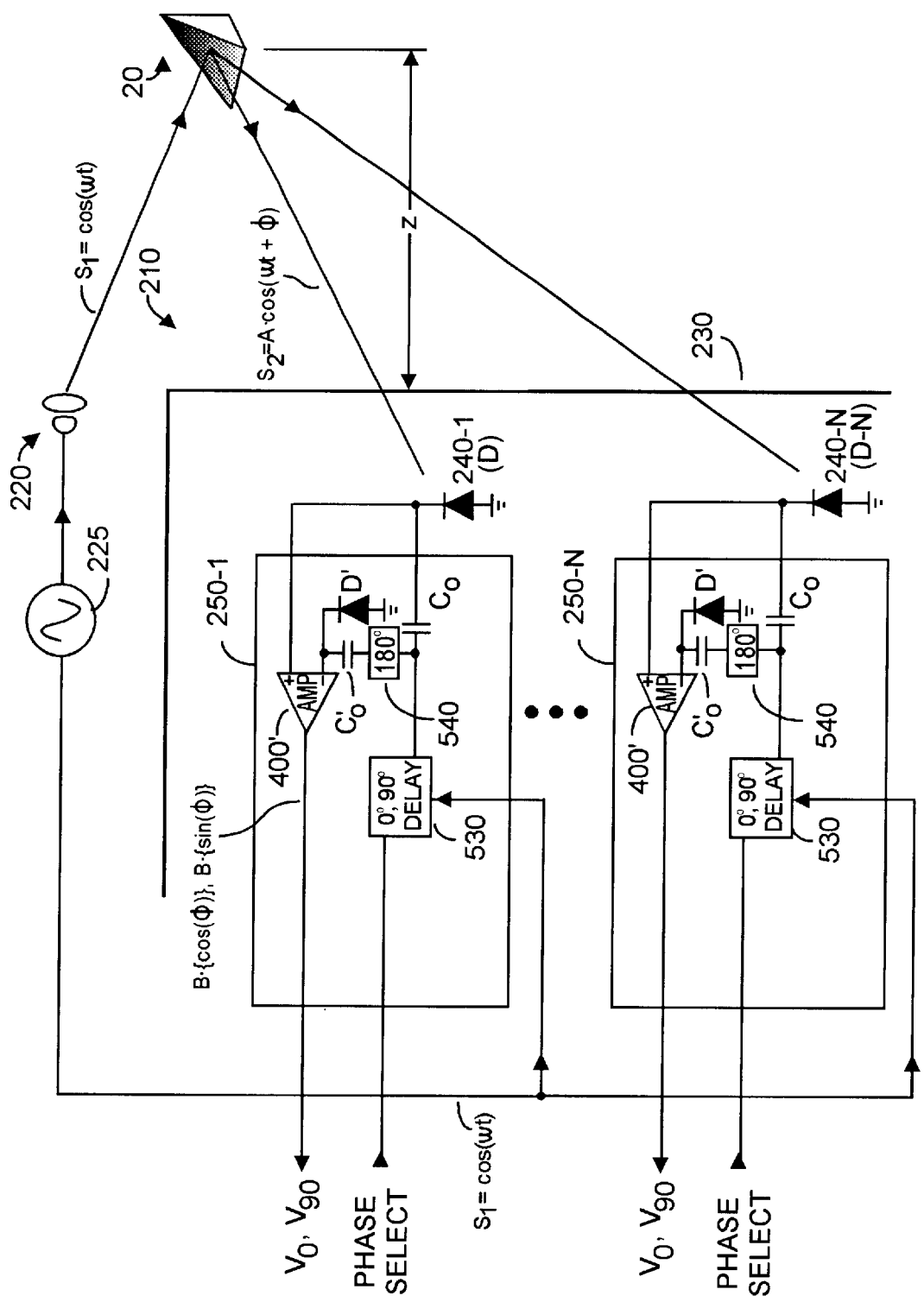
FIG. 10 is a block diagram showing two pixels comprising four photodetectors with their associated electronics in which selectable fixed phase QE modulation of the photodiodes is used, according to the present invention.

In FIG. 10, system 200 (see FIG. 3) is permitted to operate for a large number of cycles (where core frequency is ω), after which the laser or other photon energy emitter 220 is shut down. When emitter 220 is shut down, the diode modulating voltage signal and its complementary signal are set to a fixed magnitude. In the following description, so-called "cos(ωt)+1" analysis will be used. Assuming that QE modulation is somewhat linear, the result of multiplying the photodiode (D) signal (B{cos(ωt+φ)+1}) with the modulating signal (cos(ωt)+1)) and then integrating is B(0.5{cos (φ)}+1). The result of multiplying the photodiode (D') signal (B{cos(ωt+φ)+1}) with the modulating signal (cos(ωt+180°)+1)) is B(−0.5{cos(φ)}+1). Subtracting the two expressions will then yield at the output of differential amplifier 400' the signal $V_0=B \cdot \cos(\phi)$, where B is a brightness coefficient. A new measurement is then carried out with the modulation phase 90° apart from the original modulating signal. The result at the output of amplifier 400' will then be $V_{90}=B \cdot \sin(\psi)$. From the 0° and 90° measurements, angle ψ can be obtained from:

$$\tan(\psi)=V_{90}/V_0.$$

The brightness B can be obtained from $$B=\sqrt{V_0^2+V_{90}^2}$$

Advantageously, and in contrast to the embodiments described earlier herein, the configuration of FIG. 10 does not require an integrator within each electronics 240-x, thereby simplifying the system design.

A further advantage of the configuration of FIG. 10 is that impedance-matching inductors may be employed to reduce system operating power. For example, assume each photodiode 240-x is about 15 μm square and has capacitance (C) of about 10 FF. Assume too that the modulating frequency f, where f=ω/(2Π), is about 1 GHz, and that system 200 is operated from a 3 VDC power source (V), for example a battery supply. Power consumption per photodiode pixel will be proportional to $C \cdot V^2 \cdot f$ and will be about 8 μW. For an array 230 comprising 200 pixels ×200 pixels, power consumption will be about 0.32 W.

Figure 11A:
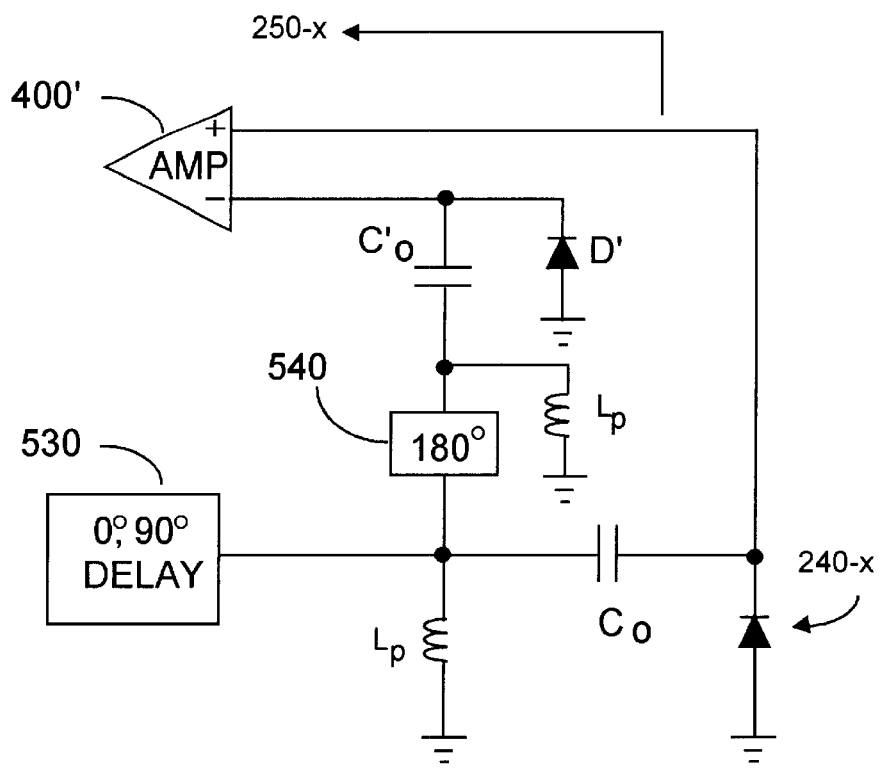
FIGS. 11A and 11B depict use of tuned inductors with photodiodes in the configuration of FIG. 10, to reduce power consumption, according to the present invention.

Since power consumption is directly proportional to capacitance C, power consumption can be reduced by decreasing the effective capacitance. This desired result is achieved by coupling a tuned inductor ($L_p$) in parallel with the capacitance of the photodiodes. However if tuned inductors $L_p$ were placed inside each pixel as shown in FIG. 11A, to resonant at 1 GHz, each inductor $L_p$ would be on the order of 100 μH, far too large a value to implement within each pixel photodiode.

Figure 11B:
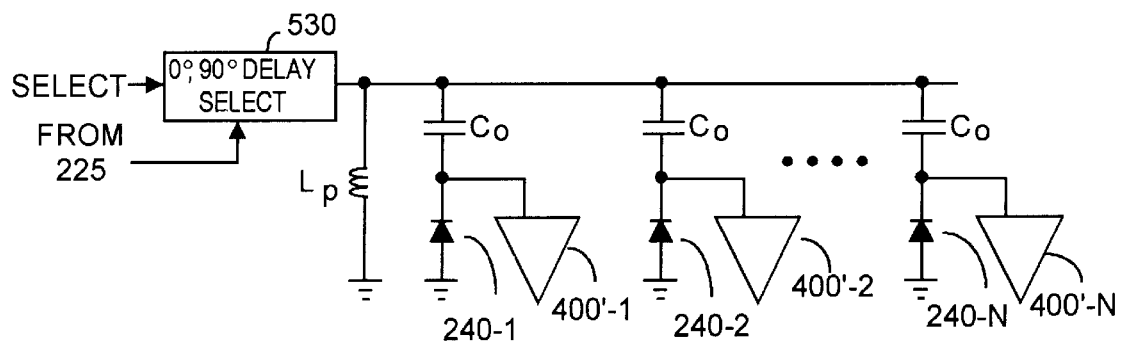

In contrast to the VPD QE modulation embodiment of FIG. 9C, in the embodiment of FIG. 10, all pixels are modulated using a common modulation signal for each parallel-coupled bank of photodiodes, akin to photodiodes A and B in FIG. 8C. An advantage of this configuration is that all photodiodes in a bank of parallel-coupled photodiodes be driven in parallel. The various parasitic shunt capacitances for each parallel-coupled photodiode are themselves coupled in parallel. The result is that one (or relatively few) inductors need be parallel-coupled to all photodiodes in a parallel-bank to achieve resonance at the desired frequency. In the above example of a 200×200 array, 100 µH would be required for each pixel photodiode. By parallel-coupling say 200×200 photodiodes lowers the value of $L_p$ to 100 µH/(200·200) or 0.25 nH, a very realistic magnitude of inductance to fabricate. Further, array sizes may indeed be larger than 200×200, in which case the overall capacitance of a greater number of photodiodes increases, which further reduces the magnitude of the single inductor $L_p$ required to resonate at the desired QE modulation frequency. Such inductance may be fabricated on IC chip 210 or even mounted off-chip. For the above example, a single inductor $L_p$ in FIG. 11B on the order of 0.25 nH would tune-out the effective capacitance of the 200×200 photodiodes that are parallel-coupled, whereas in FIG. 11A, each photodiode would require a separate inductor of substantially greater inductance.

The fixed phase delay (category two) configuration of FIG. 10 is intended to be exemplary. In practice, various so-called spatial multiplexing and temporal multiplexing techniques may be employed. Different spatial topologies (of which differential QE modulation shown in FIG. 8C is but one example) can be used to refer to different groups or banks of photodetectors within the array that can be modulated group-wise with a fixed phase. Spatial topology can enhance collection of photon-energy released charges within the photodetectors, and thus can enhance signal detection. Temporal topology refers to modulating the same bank of photodetectors with different fixed modulation phases at different times. Some spatial topologies permit spatial multiplexing, which can include the sharing of photodetectors across multiple pixels, e.g., the re-using of a same photodetector in different pixels. Temporal topology can give rise to multiplexing in time, which can promote pipelining. The present invention can implement any or all of the aspects, with various pixel bank topologies, and with various time-phase topologies.

The spatial multiplexing technique embodied in FIG. 8D is what is shown in the exemplary of configuration of FIG. 10, in which the photodetector topology was that of FIG. 8C, and in which a 0°–180°, 90°–270° time topology was used. Further, the exemplary configuration of FIG. 10 may also be used to support spatial-multiplexing of the photodiodes, as well as time-multiplexing or pipelining.

Figure 12A:
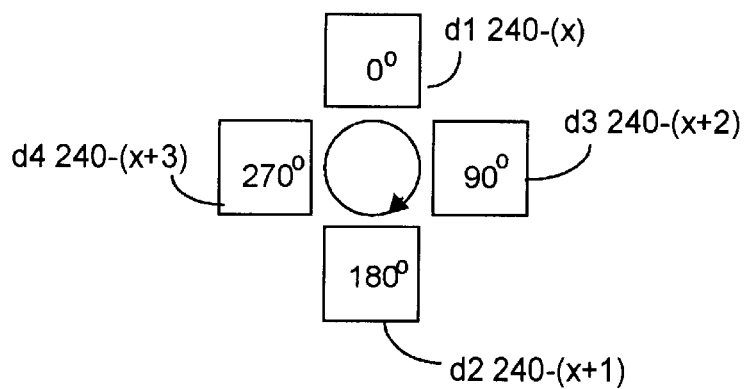
FIG. 12A is a plan view of a 0°–90°–180°–270° spatial-multiplexing QE modulation embodiment, showing four adjacent photodetectors according to the present invention.

A different spatial topology embodiment of the present invention will now be described with reference to FIG. 12A. The spatial-multiplexing embodiment of FIG. 12A operates in principle similarly to the 0°–180°–90°–270° time-division topology embodiment of FIG. 10. The difference, however, is that measurements are now obtained simultaneously at time $\tau_1$, for example using four photodetectors $d_1$ or 240-(x), $d_2$ or 240-(x+1), $d_3$ or 240-(x+2), and $d_4$ or 240-(x+3), shown in plan view in FIG. 12A.

As before, $\Delta V_d = [\Delta V_{d1}(\tau_1) - \Delta V_{d2}(\tau_1)]/[\Delta V_{d3}(\tau_1) - \Delta V_{d4}(\tau_1)] = \tan(\phi)$.

Figure 12B:
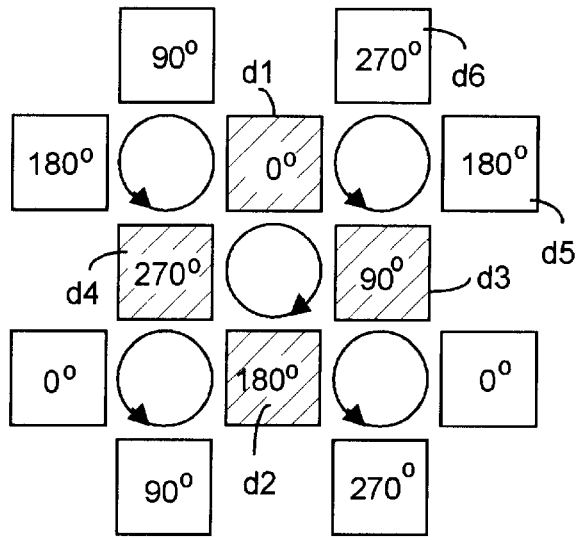
FIG. 12B depicts sharing of photodetectors across different pixels for the spatial-multiplexing QE modulation embodiment of FIG. 12A, according to the present invention.

Turning now to FIG. 12B, it will be appreciated that photodetectors may be shared in different pixels across the photodetector array. In FIG. 12B, the four detectors shown in FIG. 12A are depicted with cross-hatching so that their dual-role can be seen. For example, photodiodes d1-d2-d3-d4 may be said to form a cluster of four photodetectors within a pixel in array 230. However, photodiodes d1 and d3 are also members of a photodiode cluster comprising photodiodes d1, d5, d3, d6, and so on. Note that while individual photodetectors can play multiple roles in different clusters, no additional IC chip area is required to implement the spatially-multiplexed embodiment shown, thus promoting efficient use of IC chip area. If desired, additional data measurements are obtained by reusing partial measurements in space.

If desired, a 0°–120°–240° time-division QE modulation embodiment may be carried out, although this may not be the most efficient embodiment. In such embodiment two measurements taken from the array of pixels shown in FIG. 8C at time frames $\tau_1$ and $\tau_2$ are used. For the first measurement at time $\tau_1$, a photodetector bank (bank A) comprising photodetectors A is enabled with an S1(t) sinusoidal waveform at 0° phase, while adjacent photodetector bank (bank B) comprising photodetectors B is de-phased 120° by S2(t). For the second measurement at time $\tau_2$, bank B is de-phased 120° and bank A is de-phased 240°. The total phase difference is derived as follows:

$$\Delta V_d = [\Delta V_{d2}(\tau_2) - \Delta V_{d1}(\tau_2)]/\Delta V_{d1}(\tau_1),$$

where at time $\tau_1$ $$\Delta V_{d1} = A[1+\cos(\omega t)]\cos(\omega t+\phi)$$

$$\Delta V_{d1} = A\cos(\omega t+\phi) + 0.5A\{\cos(\phi)+\cos(2\omega t+\phi)\}$$

and at time $\tau_2$ $$\Delta V_{d1} = A[1+\cos(\omega t-120)]\cos(\omega t+\phi)$$

$$\Delta V_{d1} = A\cos(\omega t+\phi) + 0.5A[\cos(\phi-120)+\cos(2\omega t+\phi+120)]$$

$$\Delta V_{d2} = A[1+\cos(\omega t-240)]\cos(\omega t+\phi)$$

$$\Delta V_{d2} = A\cos(\omega t+\phi) + 0.5A[\cos(\phi-120)+\cos(2\omega t+\phi+120)]$$

hence, after filtering $$\Delta V_d = [\cos(\phi-120)-\cos(\phi+120)]/\cos(\phi)$$

$$\Delta V_d = 2\sin(\phi)\sin(120)/\cos(\phi)$$

$$\Delta V_d = K_1 \sin(\phi)/\cos(\phi)$$

$$\Delta V_d = K_1 \tan(\phi), \text{ where } K_1 = \sqrt{3}.$$

Figure 12C:
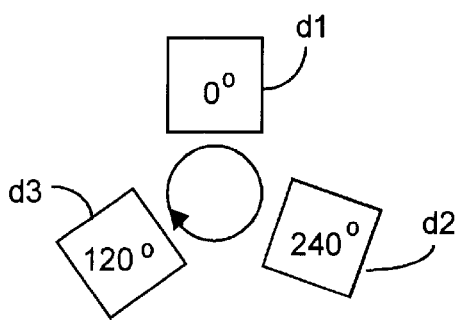
FIG. 12C depicts a 0°–120°–240° spatial-division multiplexing QE modulation embodiment showing three photodetectors, according to the present invention.

Referring now to FIG. 12C, a 0°–120°–240° modulation (spatial-multiplexing) embodiment is shown. This spatial-multiplex embodiment is similar to the above-described 0°–120°–240° time-division multiplex embodiment except that measurements are obtained simultaneously at time $\tau_1$ using three detectors $d_1$, $d_2$, and $d_3$. As above, $$\Delta V_d = [\Delta V_{d3}(\tau_1) - \Delta V_{d2}(\tau_1)]/\Delta V_{d1}(\tau_1) = K_1 \tan(\phi), \text{ where } K_1 = \sqrt{3}.$$

It will be appreciated from what has been described with respect to FIG. 12B, that photodetectors in FIG. 12C may be shared across different pixels in photodetector array 230.

Referring back to FIG. 8C, it will be appreciated that each photodetector in a bank A can be shared across four pixels, e.g., top and bottom, left and right. For example, in the second row of photodetectors, the first detector A may be associated with each of the four adjacent detectors B.

Figure 13A:
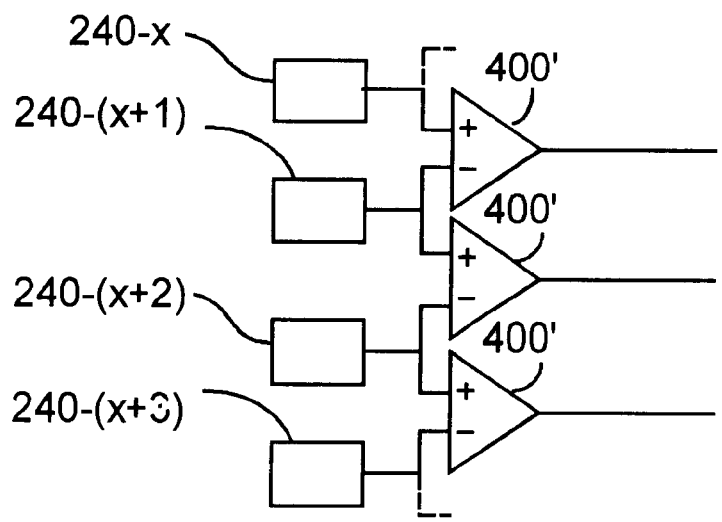
FIGS. 13A and 13B depict differential and single-ended signal processing of photodetector output, according to the present invention.
Figure 13B:
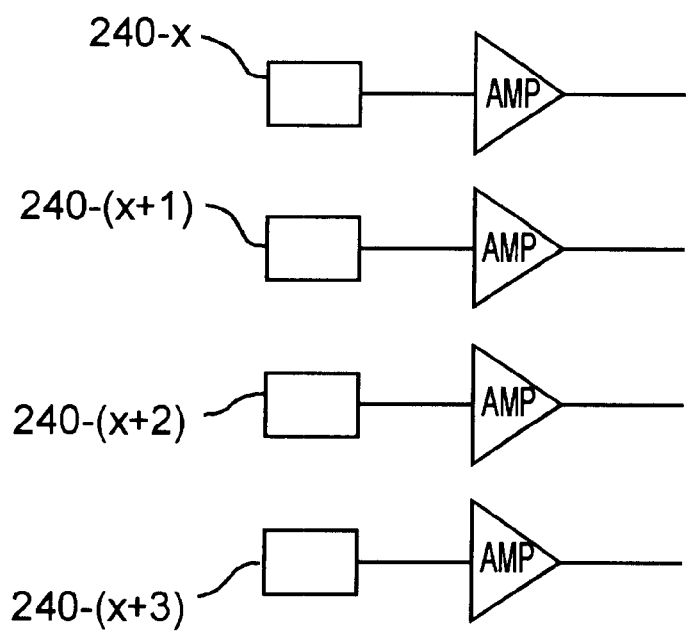

It will be appreciated that to facilitate spatial multiplexing according to the present invention, it can be advantageous to obtain raw data single-endedly from each photodetector, rather than obtain differential data, e.g., first generate a difference signal between banks of photodiode detectors. QE modulation is preferably still carried out differentially, i.e., with multiple banks of detectors modulated with different phases. Such single-ended raw data can be preferable in that greater flexibility can exist in signal processing the data, e.g., adding or subtracting data from adjacent photodetectors (e.g., perhaps digitally), than if only differential data were available. FIG. 13A shows typically differential signal processing of photodetector output whereas FIG. 13B shows single-ended signal processing.

The concept of pipelining with respect to embodiments such as shown in FIG. 10 will now be described. As used herein pipelining refers to reduction of latency in obtaining pixel measurements in successive frames of acquired data.

One can interlace measurements within frames of acquired data to increase measurement throughput as follows:

0°–180° measurement: $\Delta V_A(\tau_1)$

90°–270° measurement: $\Delta V_A(\tau_2) \rightarrow \Delta V_A(\tau_2)/\Delta V_A(\tau_1) = \tan(\phi)$ 0°–180° measurement: $\Delta V_A(\tau_3) \rightarrow \Delta V_A(\tau_2)/\Delta V_A(\tau_3) = \tan(\phi)$ 90°–270° measurement: $\Delta V_A(\tau_4) \rightarrow \Delta V_A(\tau_4)/\Delta V_A(\tau_3) = \tan(\phi)$, etc.

In this fashion, a continuous pipeline of measurement information can be computed with an effective doubling of computational speed, yet with a latency of one measurement. Indeed, one advantage of the above-described time-division multiplexing QE modulation embodiment is that frame rate of data acquisition is substantially increased. As noted, on-chip CPU system 260 may be used to perform the information processing steps described herein, and on-chip electronics 250-x can implement that various forms of QE modulation and signal processing that have been described.

Referring once again to FIG. 8A, assume that each of the two side-by-side photodetectors 240-(x) (or detector "A") and 240-(x+1) (or detector "B") have substantially identical area when seen in a planar view. What will now be described are techniques for reducing mal-effects of non-uniform illumination falling upon these photodetectors, including effects associated with differences in actual photodetector effective areas, and also reducing 1/f noise associated with gain of the amplifiers used with these photodetectors.

Referring to FIG. 3 and to FIG. 8A, assume that photon energy returned from target object 20 falls upon photodetectors A and B, and that these two photodetectors output different signals, e.g., different magnitudes. The detected output signal may be different for several reasons. Perhaps the illumination falling upon photodetector A differed from the illumination falling upon photodetector B. Perhaps the effective detection area of photodetector A differed from photodetector B due to component mismatching, or perhaps photodetector A was simply better fabricated and exhibits better detection characteristics.

Referring again to the embodiment of FIG. 10, and using a "1+cos" analysis for simplicity of explanation, let the incoming photon energy signal seen by photodetector A is $A'\{\cos(\omega t+\phi)+1\}$ and let the incoming photon energy signal seen by detector B be $B'\{\cos(\omega t+\phi)+1\}$. If A'=B', there is uniform illumination, but not otherwise. The more general case, however, results where A' and B' are not identical.

In FIG. 10, the energy signal seen by detector A, $A'\{\cos(\omega t+\phi)+1\}$, is multiplied by $\{\cos(\omega t)+1\}$ to yield after accumulation $A'(0.5\cos(\phi)+1)$, hereafter denoted expression {1}. Similarly, the energy signal seen by detector B, $B'\{\cos(\omega t+\phi)+1\}$, is multiplied by $\{\cos(\omega t+180°)+1\}$ to yield, after accumulation, $B'(-0.5\cos(\phi)+1)$, hereafter denoted expression {2}. If A'=B', then it would be a simple matter to obtain $A'\cos(\phi)$, as described earlier herein. The problem is that A' and B' are not equal.

In the earlier description of FIG. 10, a goal was to arrive at $Kb\{\cos(\phi)\}$ and $Kb\{\sin(\phi)\}$, where Kb is a brightness coefficient. For the case of non-uniform illumination, the present invention now multiplies $A'(\cos(\omega t+\phi)+1)$ by $\{\cos(\omega t+180°)+1\}$, which after integration yields $A'(-0.5\cos(\phi)+1)$, hereafter expression {3}. Further, the present invention also multiplies $B'\{\cos(\omega t+\phi)+1\}$ by $\{\cos(\omega t)+1\}$ to yield $B'(0.5\cos(\phi)+1)$, hereafter expression {4}.

At this juncture, the present invention performs the mathematics to carry out (expression {1}-expression {2})-(expression {3}-expression {4}), to arrive at $(A'+B')\{\cos(\phi)\}$. Similarly the same operation can be carried out to arrive at the equivalent $(A'+B')\{\sin(\phi)\}$, as noted earlier with respect to FIG. 10.

Thus, one calculation may be carried out upon (expression {1}-expression {2}) and a similar calculation carried out upon (expression {3}-expression {4}). Schematically, the procedure may be carried out as follows, referring now to FIG. 8A, FIG. 10, and FIGS. 14A and 14B:

(1) at time 0<t<t1, detector D or 240-(x) is biased with signal $S1=1+\cos(\omega t)$ and detector 240-(x+1) is biased with signal $S2=1+\cos(\omega t+180°)$, e.g., 0° and 180° modulation;

(2) signals output from the two detectors are accumulated during time 0<t<t1 and at time t=t1, the differential signal is stored or sampled in digital or analog form;

(3) during time t1<t<t2, detector 240-(x) is biased with signal $S1=1+\cos(\omega t+180°)$ and detector 240-(x+1) is biased with signal $S2=1+\cos(\omega t)$;

(4) output signals from the two detectors are accumulated, and at the end of accumulation at time t=t2, the differential signal is stored or sampled, in digital or analog form; and (5) a difference signal is computed for the analog and/or digital signals that have been sampled or stored.

Figure 14A:
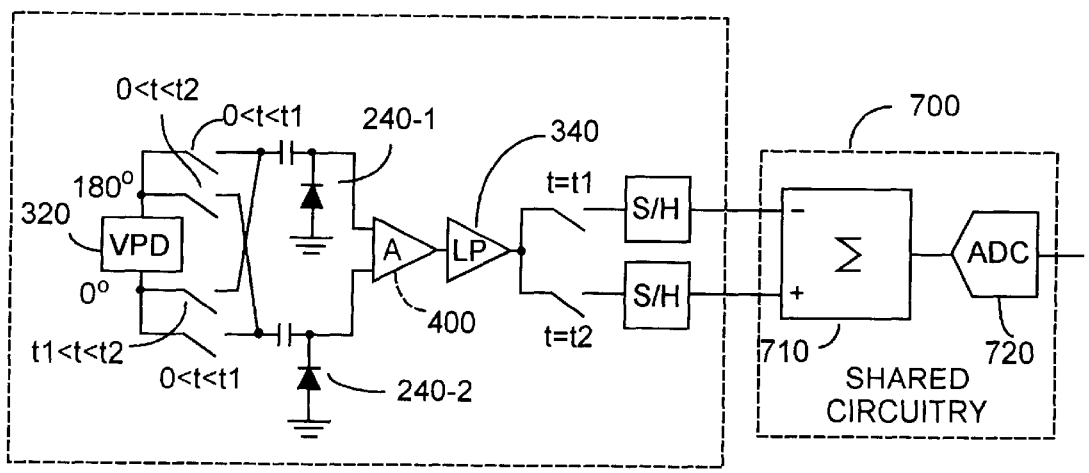
FIGS. 14A and 14B depict circuit configurations to reduce effects of non-uniform illumination and 1/f noise effects upon photodetectors, according to the present invention.
Figure 14B:
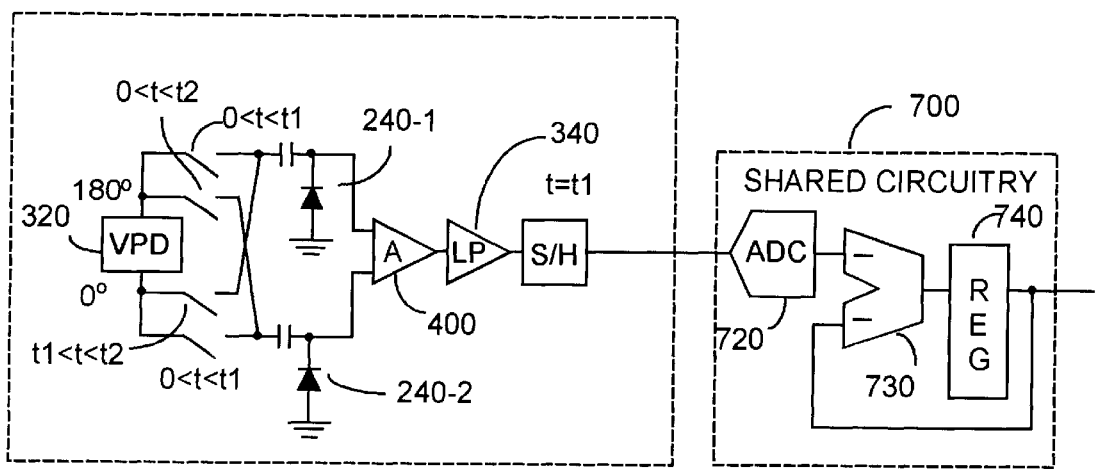

FIGS. 14A and 14B depict exemplary techniques for signal subtraction in the analog domain and in the digital domain, respectively. The analog or digital "shared" components 700 may be placed outside the photodiode pixel detector, perhaps using one shared component per each column in the row-column array of pixel detectors. Sample and hold (S/H) units within the pixel will hold both measurements for the entire duration of a read-out operation, which operation is repeated independently for each row of pixels. Alternatively, one might perform averaging and even the analog-to-digital (ADC) conversion within the pixel block.

In FIG. 14A, the shared circuitry 700 includes an analog summer 710 whose analog output is digitized by an analog-to-digital converter 720. In FIG. 14B, the shared circuitry is essentially a digital adder 730 whose inputs are negated. The output from adder 730 is input to a register 740 whose output is fedback to an input of the adder. An A/D converter 720 presents digital input to the adder. In FIG. 14B, averaging is carried out in the digital domain, and analog-digital conversion can be shared across all rows of pixels, which means a S/H will be required per pixel to hold the accumulated voltage signal before the signal is delivered to the ADC for conversation. Thus in the digital domain embodiment of FIG. 14B, signal averaging requires twice as many A/D conversions than in the analog domain embodiment of FIG. 14A. It will be appreciated that similar approaches can be used in the various other modulation schemes that have been described, including time-division multiplexing, and spatial multiplexing.

In the various embodiments described herein, movement of objects within a detected image contour can be computed, e.g., by microprocessor 260, by identifying contour movements between frames of acquired data. The pixel detectors within the contour can all receive a uniform velocity that is the velocity of the contour. Since objects can be identified using their contours, one can track objects of interest using the on-chip processor 260. As such, if desired IC chip 210 can export a single value (DATA) that can represent change in location of the entire object 20 whenever it has moved. Thus instead of exporting from the IC chip an entire frame of pixels at the frame rate, a single vector representing the change in location of the object of interest may instead be sent. So doing results in a substantial reduction in IC chip input/output and can greatly reduce off-chip data processing requirements. It will be appreciated that the on-chip microprocessor 260 can also supervise sequencing of spatial and/or temporal topologies, and can also optimize spatial and/or temporal multiplexing.

In other applications, system 200 may be called upon to recognize an object that is a virtual input device, for example a keyboard whose virtual keys are "pressed" by a user's fingers. For example, in co-pending U.S. application Ser. No. 09/502,499, filed Feb. 11, 2000, and entitled "Method and Apparatus for Entering Data Using a Virtual Input Device" a three-dimensional range-finding TOF system is used to implement virtual input devices. As a user's hand or stylus "presses" a virtual key or region on such device, the system using TOF measurements can determine which key or region is being "pressed". The system can then output the equivalent of key stroke information to a companion device, for example a PDA that is to receive input data from the interaction of a user with the virtual input device. The present invention may be used in such application, in which case DATA in FIG. 3 could represent keystroke identification information that has been processed on-chip by microprocessor 260.

As noted, microprocessor 260 executing software perhaps associated with memory 270 can control modulation of generator 225 and detection by the various electronic circuits 250. If desired, detection signals may be processed using special image processing software. Since system 200 preferably can be battery operated due to its low power consumption, when such software determines that sufficient image resolution is attained, operating power may be terminated selectively to various portions of array 230. Further if sufficient photon energy reaches array 230 to ensure adequate detection, the shape of signals output by emitter 220 could be changed. For example, the peak power and/or duty cycle of the emitter energy could be reduced, thus reducing overall power consumption by system 200. The design tradeoffs in changing the shape of the optical energy output signal involve considerations of z-resolution accuracy, user safety, and power handling capacity of emitter 220.

In summary, the overall system advantageously can be operated from a small battery in that peak and average power from optical emitter 220 is preferably in the tens of mW range. Nonetheless distance resolution is in the cm range, and signal/noise ratios are acceptable. Although various embodiments have been described with respect to acquiring information proportional to distance z, it will be appreciated that, if desired, the present invention could be practiced to acquire information relating solely to brightness of a target object. In such an application, the present invention can be used essentially as a rather good filter that substantially reduces ambient light effects upon brightness information. Whereas acquiring z-information may involve modulating an energy source at a modulation frequency in excess of 100 MHz, an application directed to acquiring brightness information could modulating the energy source at a substantially lower rate, perhaps 50 Khz or so.

Modifications and variations may be made to the disclosed embodiments without departing from the subject and spirit of the invention as defined by the following claims.

What is claimed is:

1. A method to determine distance z between at least one photodetector, and a target, the method comprising the following steps:
   (a) illuminating said target with optical energy that has a modulated periodic waveform that includes a high frequency component $S_1(\omega \cdot t)$;
   (b) detecting with said photodetector a fraction of said optical energy reflected from said target; and
   (c) modulating quantum efficiency of said photodetector to process signals detected at step (b) to yield data proportional to said distance z.

2. The method of claim 1, further including a plurality of photodetectors fabricated on an integrated circuit chip;
   wherein said integrated circuit chip includes circuitry that carries out step (b) and step (c).

3. The method of claim 1, wherein said plurality includes at least one of (i) photodiode detectors, (ii) MOS devices with a bias gate, and (iii) MOS devices with a photogate.

4. The method of claim 1, wherein detecting at step (b) includes measuring a change in phase between optical energy emitted at step (a) and a signal detected at step (b).

5. The method of claim 4, wherein step (c) includes using a variable phase delay that is coupled to a source of said modulated periodic waveform, operating in a closed-loop, such that phase delay of said variable phase delay indicates phase delay of a signal detected at step (b).

6. The method of claim 4, wherein step (c) includes use of at least one fixed phase delay.

7. The method of claim 4, wherein said change of phase is proportional to said distance z.

8. The method of claim 1, wherein step (c) includes varying reverse bias of said photodetectors.

9. The method of claim 1, wherein said photodetectors include photogate detectors, and step (c) includes varying gate potential of said photogate detectors.

10. The method of claim 1, wherein:
    detecting at step (b) includes measuring a change in phase between optical energy emitted at step (a) and a signal detected at step (b); further including:
    defining banks of said photodetectors; and
    enhancing efficiency of said quantum efficiency modulation by modulating banks of said photodetectors with different phases.

11. The method of claim 1, wherein said photodetectors are formed on a semiconductor substrate; and
    step (c) includes creating an electrical current in said substrate to promote collection of photocharges released within said substrate by reflected said optical energy;
    wherein quantum efficiency modulation is enhanced.

12. The method of claim 1, wherein said photodetectors are formed on a semiconductor substrate including an epitaxial region; and
    step (c) includes using a substrate whose said epitaxial region has at least one characteristic selected from (i) said epitaxial region comprises a plurality of layers each having a different doping concentration, wherein an uppermost one of said layers is less highly doped than a lower one of said layers, (ii) said epitaxial region defines a layer in which there is a dopant gradient such that doping concentration is greater at a lower portion of said region than at an upper portion thereof.

13. The method of claim 1, further including coupling an inductor so as to detune at least some capacitance coupled to a voltage node of said detector controlling quantum efficiency modulation thereof;
wherein power dissipation of said capacitance is reduced.

14. The method of claim 1, further including:
defining at least a first bank of said photodetectors and a second bank of said photodetectors, each said bank being quantum efficiency modulated with a constant phase;
defining at least one pixel comprising a said photodetector from said first bank and from said second bank;
wherein step (c) includes processing an output from one said photodetector for use by more than one said pixel.

15. The method of claim 1, wherein:
distance z in determined over multiple time frames; and
claim (c) further includes:
on a per frame basis, quantum efficiency modulating said photodetector with at least a first phase shift, and acquiring information from said photodetector during said first phase shift; and
wherein information acquired from said photodetector during said first phase shift is used in at least two said time frames.

16. The method of claim 1, further including:
digitizing an analog output from each said photodetector.

17. The method of claim 1, wherein said frequency $\omega$ is at least 100 MHz.

18. The method of claim 1, further including providing an integrated circuit that includes electronic circuitry that carries out at least one of step (b) and step (c).

19. The method of claim 1, wherein step (a) includes illuminating said target with optical energy having wavelength of about 850 nm.

20. A method to determine amplitude of a fraction of emitted optical energy that is reflected from a target, the method comprising the following steps:
(a) illuminating said target with optical energy that has a modulated periodic waveform that includes a high frequency component $S_1(\omega \cdot t)$;
(b) providing at least one photodetector to detect said fraction of optical energy reflected by said target;
(c) detecting with said photodetector said fraction of said optical energy reflected from said target; and
(d) modulating quantum efficiency of said photodetector to process signals detected at step (c) to yield data proportional to amplitude.

21. The method of claim 20, wherein said frequency $\omega$ is at least 100 Hz.

22. The method of claim 20, wherein step (a) includes illuminating said target with optical energy having wavelength of about 850 nm.

* * * * *